US011473999B2

(12) United States Patent
Matsukawa

(10) Patent No.: US 11,473,999 B2
(45) Date of Patent: Oct. 18, 2022

(54) LEAK INSPECTION DEVICE AND LEAK INSPECTION METHOD

(71) Applicant: TOYOTA JIDOSHA KABUSHIKI KAISHA, Aichi-ken (JP)

(72) Inventor: Tetsuya Matsukawa, Okazaki (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 1 day.

(21) Appl. No.: 17/153,879

(22) Filed: Jan. 21, 2021

(65) Prior Publication Data
US 2021/0278308 A1   Sep. 9, 2021

(30) Foreign Application Priority Data

Mar. 3, 2020   (JP) .............................. JP2020-036023

(51) Int. Cl.
*G01M 3/32*   (2006.01)

(52) U.S. Cl.
CPC ................................. *G01M 3/3263* (2013.01)

(58) Field of Classification Search
CPC ............ G01M 3/3236; G01M 3/3263; G01M 3/3272; G01M 3/34; G01M 3/00; G01M 3/007; G01M 3/3209
See application file for complete search history.

(56) References Cited

U.S. PATENT DOCUMENTS 6,182,501 B1 *  2/2001  Furuse ................ G01M 3/3263
                                                                 73/49.3

FOREIGN PATENT DOCUMENTS

JP   2000205991 A  *  7/2000
JP   2000205991 A     7/2000

* cited by examiner

*Primary Examiner* — John Fitzgerald
*Assistant Examiner* — Truong D Phan
(74) *Attorney, Agent, or Firm* — Hauptman Ham, LLP

(57) ABSTRACT

A leak inspection device includes an inspection mechanism that executes a first inspection process for compressing the insides of a first inspection chamber and a reference chamber, and inspecting the first inspection chamber for a pressure leak based on a differential pressure therebetween, and a second inspection process for compressing the insides of a second inspection chamber and the reference chamber, and inspecting the second inspection chamber for a pressure leak based on a differential pressure therebetween, a first pre-compression valve that opens and closes a first pre-compression path, and a control device that opens, during the execution of the first inspection process, the first pre-compression valve to pre-compress the second inspection chamber, and causes, in a state where the inside of the second inspection chamber is pre-compressed, the inspection mechanism to execute the second inspection process.

15 Claims, 19 Drawing Sheets

LEAK INSPECTION DEVICE AND LEAK INSPECTION METHOD

CROSS-REFERENCE TO RELATED APPLICATION

This application claims priority to Japanese Patent Application No. 2020-036023 filed on Mar. 3, 2020, incorporated herein by reference in its entirety.

BACKGROUND

1. Technical Field

The present disclosure relates to a leak inspection device and a leak inspection method.

2. Description of Related Art

A leak inspection device used for inspecting a plurality of inspection chambers for pressure leaks is well-known. For example, in a technology disclosed in Japanese Unexamined Patent Application Publication No. 2000-205991 (JP 2000-205991 A), the insides of first and second inspection chambers, and the inside of a reference chamber are simultaneously compressed, the first inspection chamber is inspected for a pressure leak based on a differential pressure between the inside of the first inspection chamber and the inside of the reference chamber, and the second inspection chamber is inspected for a pressure leak based on a differential pressure between the inside of the second inspection chamber and the inside of the reference chamber.

SUMMARY

In the technology disclosed in JP 2000-205991 A, the first inspection chamber and the second inspection chamber are connected to each other via a common path. A differential pressure between the inside of the common path and the inside of a path connected to the reference chamber is measured as the differential pressure between the inside of the first inspection chamber and the inside of the reference chamber, and inspection of the first inspection chamber for a pressure leak is executed. Then, the differential pressure between the inside of the common path and the inside of the path connected to the reference chamber is measured as the differential pressure between the inside of the second inspection chamber and the inside of the reference chamber, and inspection of the second inspection chamber for a pressure leak is executed. For example, when there is a pressure leak from the first inspection chamber, the pressure inside the first inspection chamber decreases and a pressure inside the above-described common path also decreases. On the other hand, when there is no pressure leak from the first inspection chamber, the pressures inside the first inspection chamber and the common path do not decrease. In addition, the pressure inside the common path changes depending on the degree of the pressure leak from the first inspection chamber. For this reason, the pressure inside the common path at the start of the inspection of the second inspection chamber also differs depending on the presence or absence of, and the degree of a pressure leak from the first inspection chamber. As a result, accuracy of inspection of the second inspection chamber may decrease.

For example, it is conceivable to inspect the first inspection chamber after compressing the insides of the first inspection chamber and the reference inspection chamber, and then inspect the second inspection chamber after compressing the insides of the second inspection chamber and the reference inspection chamber. However, in this case, when the first and the second inspection chambers are compressed in this order, it takes time to complete the inspection of these inspection chambers.

The present disclosure provides a leak inspection device and a leak inspection method capable of inspecting a plurality of inspection chambers for pressure leaks with high accuracy in a short time period.

A leak inspection device according to a first aspect of the present disclosure includes an inspection mechanism configured to execute a first inspection process for compressing the inside of a first inspection chamber and the inside of a reference chamber using a compressed gas, and for inspecting the first inspection chamber for a pressure leak based on a differential pressure between the inside of the first inspection chamber and the inside of the reference chamber, and a second inspection process for compressing, after an end of the first inspection process, the inside of a second inspection chamber and the inside of the reference chamber using the compressed gas, and for inspecting the second inspection chamber for a pressure leak based on a differential pressure between the inside of the second inspection chamber and the inside of the reference chamber, a first pre-compression path configured to pre-compress the inside of the second inspection chamber using the compressed gas, a first pre-compression valve configured to open and close the first pre-compression path, and a control device configured to control the inspection mechanism and the first pre-compression valve. The control device is configured to, during the execution of the first inspection process, open the first pre-compression valve to pre-compress the second inspection chamber, and, in a state where the inside of the second inspection chamber is pre-compressed, cause the inspection mechanism to execute the second inspection process.

In the first aspect, the first inspection process includes a first compression process for compressing the inside of the first inspection chamber and the inside of the reference chamber, a first equilibrium process for equilibrating, after an end of the first compression process, a pressure inside the first inspection chamber and a pressure inside the reference chamber, and a first measurement process for measuring, after an end of the first equilibrium process, the differential pressure between the inside of the first inspection chamber and the inside of the reference chamber. The control device is configured to, during the execution of at least one of the first compression process and the first measurement process, open the first pre-compression valve to pre-compress the inside of the second inspection chamber.

In the first aspect, the control device may open, during the execution of the first compression process, the first pre-compression valve to pre-compress the inside of the second inspection chamber.

In the first aspect, the inspection mechanism may include a supply path connected to a supply source of the compressed gas, a reference path connected to the supply path and the reference chamber, a common inspection path connected to the supply path, a first inspection path connected to the common inspection path and the first inspection chamber, a second inspection path connected to the common inspection path and the second inspection chamber, a supply valve, a reference valve, a common inspection valve, a first inspection valve, and a second inspection valve that open and close the supply path, the reference path, the common inspection path, the first inspection path, and the second inspection path, respectively, and a measurement unit configured to measure a differential pressure between the inside of the reference path and the inside of the common inspection path which is on the downstream side of the common inspection valve. The control device may control the supply valve, the reference valve, the common inspection valve, the first inspection valve, and the second inspection valve such that the first and the second inspection processes are executed.

In the first aspect, the first pre-compression path may be connected to the supply path such that the compressed gas is supplied from the supply source.

In the first aspect, the first pre-compression path may be connected to the second inspection path on the downstream side of the second inspection valve.

In the first aspect, the first pre-compression path may be connected to the second inspection chamber, not to the second inspection path.

In the first aspect, the second inspection process may include a second compression process for compressing the inside of the second inspection chamber and the inside of the reference chamber. In the second compression process, the control device may open the supply valve, the reference valve, and the common inspection valve and close the first and the second inspection valves to start the compression of the inside of the reference chamber, and then open the second inspection valve to compress the inside of the second inspection chamber.

In the first aspect, the inspection mechanism may include a compression adjustment unit which is provided on the supply path on the downstream side of the supply valve and configured to adjust an output pressure of a supplied compressed gas. The control device may set, in the compression adjustment unit, a first compression target value, which is a target value of the pressure inside the first inspection chamber and the pressure inside the reference chamber due to the compression in the first inspection process, and set, in the compression adjustment unit, a second compression target value, which is a target value of a pressure inside the second inspection chamber and the pressure inside the reference chamber due to the compression in the second inspection process. The first and the second compression target values may be different from each other.

In the first aspect, the leak inspection device may include a second pre-compression path configured to pre-compress the inside of a third inspection chamber and a second pre-compression valve configured to open and close the second pre-compression path. The inspection mechanism may execute, after an end of the second inspection process, a third inspection process for compressing the inside of the third inspection chamber and the inside of the reference chamber using the compressed gas, and for inspecting the third inspection chamber for a pressure leak based on a differential pressure between the inside of the third inspection chamber and the inside of the reference chamber. The control device may open, during the execution of the second inspection process, the second pre-compression valve to pre-compress the inside of the third inspection chamber, and cause, in a state where the inside of the third inspection chamber is pre-compressed, the inspection mechanism to execute the third inspection process.

In the first aspect, the first and the second pre-compression paths may share a common pre-compression path. The first pre-compression path may include a first branch pre-compression path branched from the common pre-compression path and the second pre-compression path may include a second branch pre-compression path branched from the common pre-compression path. The first and the second pre-compression valves may respectively open and close the first and the second branch pre-compression paths.

In the first aspect, the control device may include a pre-compression adjustment unit which is provided on the common pre-compression path and configured to adjust an output pressure of a supplied compressed gas. The control device may set, in the pre-compression adjustment unit, a first pre-compression target value, which is a target value of the pressure inside the second inspection chamber due to the pre-compression, and set, in the pre-compression adjustment unit, a second pre-compression target value, which is a target value of a pressure inside the third inspection chamber due to the pre-compression. The first and the second pre-compression target values may be different from each other.

Further, a leak inspection method according to a second aspect of the present disclosure includes a first inspection process for compressing the inside of a first inspection chamber and the inside of a reference chamber using a compressed gas, and for inspecting the first inspection chamber for a pressure leak based on a differential pressure between the inside of the first inspection chamber and the inside of the reference chamber, and a second inspection process for compressing, after an end of the first inspection process, the inside of a second inspection chamber and the inside of the reference chamber using the compressed gas based on a differential pressure between the inside of the second inspection chamber and the inside of the reference chamber, and for inspecting the second inspection chamber for a pressure leak. The second inspection chamber is pre-compressed during the execution of the first inspection process, and the second inspection process is executed in a state where the inside of the second inspection chamber is pre-compressed.

In the second aspect, a first compression target value, which is a target value of a pressure inside the first inspection chamber and a pressure inside the reference chamber due to the compression in the first inspection process, and a second compression target value, which is a target value of a pressure inside the second inspection chamber and the pressure inside the reference chamber due to the compression in the second inspection process, may be different from each other.

In the second aspect, volumes of the first and the second inspection chambers may be different from each other.

With the foregoing aspects of the present disclosure, it is possible to provide a leak inspection device and a leak inspection method capable of inspecting a plurality of inspection chambers for pressure leaks with high accuracy in a short time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Leak Inspection Device 1

Figure 1:
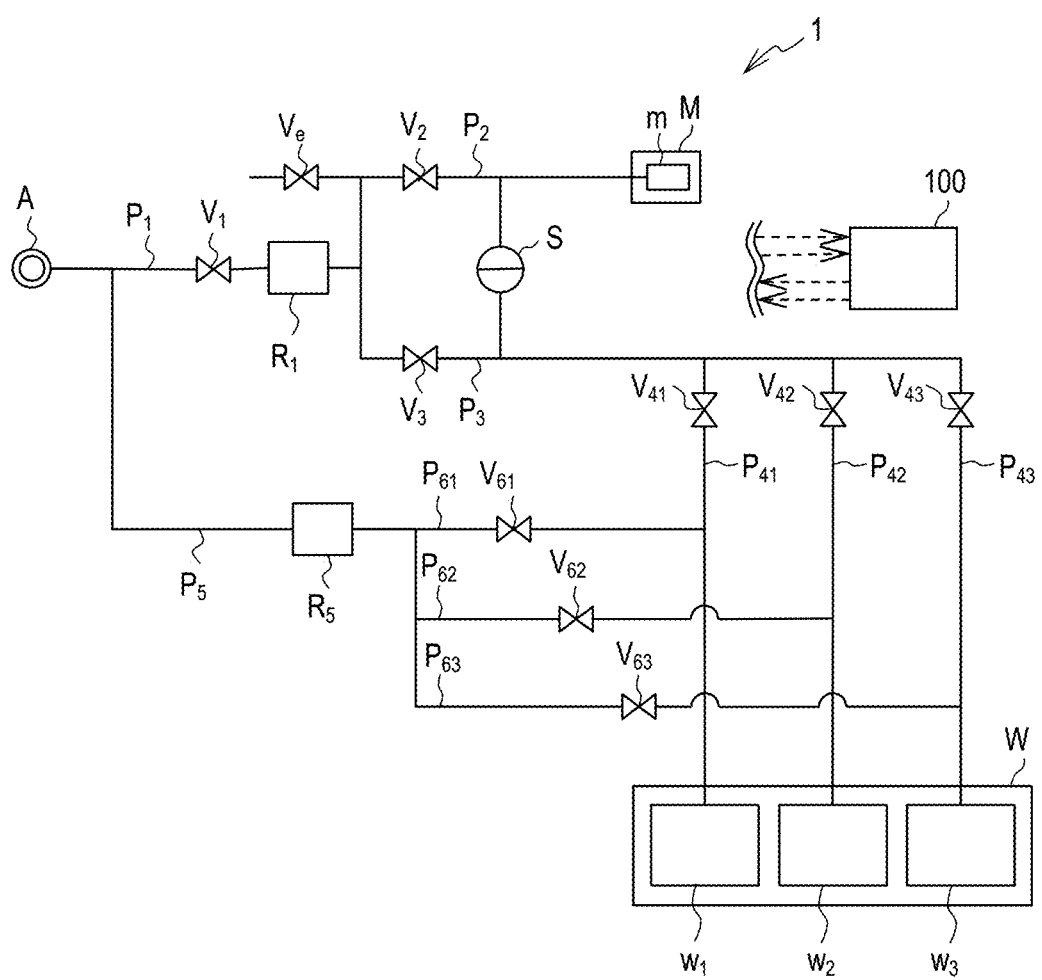
FIG. 1 is a schematic configuration diagram of a leak inspection device.

FIG. 1 is a schematic configuration diagram of a leak inspection device 1. The leak inspection device 1 includes a supply source A, a supply path $P_1$, a reference path $P_2$, a common inspection path $P_3$, branch inspection paths $P_{41}$ to $P_{43}$, a common pre-compression path $P_5$, branch pre-compression paths $P_{61}$ to $P_{63}$, a supply valve $V_1$, a reference valve $V_2$, a common inspection valve $V_3$, inspection valves $V_{41}$ to $V_{43}$, pre-compression valves $V_{61}$ to $V_{63}$, a discharge valve $V_e$, electro-pneumatic regulators $R_1$, $R_5$, a master M, a differential pressure sensor S, and a control device 100.

The supply source A may be, for example, an air pump. The supply path $P_1$, the reference path $P_2$, the common inspection path $P_3$, the branch inspection paths $P_{41}$ to $P_{43}$, the common pre-compression path $P_5$, and the branch pre-compression paths $P_{61}$ to $P_{63}$ are composed of a plurality of connected pipes. The supply valve $V_1$, the reference valve $V_2$, and the common inspection valve $V_3$ are provided on the supply path $P_1$, the reference path $P_2$, and the common inspection path $P_3$, respectively, to open/close them. The inspection valves $V_{41}$ to $V_{43}$ are provided on the branch inspection paths $P_{41}$ to $P_{43}$, respectively, to open/close them. The pre-compression valves $V_{61}$ to $V_{63}$ are provided on the branch pre-compression paths $P_{61}$ to $P_{63}$ respectively, to open/close them. The electro-pneumatic regulators $R_1$ and $R_5$ are provided on the supply path $P_1$ and the common pre-compression path $P_5$, respectively. The electro-pneumatic regulator $R_1$ is provided on the downstream side of the supply valve $V_1$.

The supply valve $V_1$, the reference valve $V_2$, the common inspection valve $V_3$, the inspection valves $V_{41}$ to $V_{43}$, the pre-compression valves $V_{61}$ to $V_{63}$, the discharge valve $V_e$, and the electro-pneumatic regulators $R_1$, $R_5$ are electrically connected to the control device 100 that controls operations thereof. Each of the electro-pneumatic regulators $R_1$ and $R_5$ adjusts a pressure of a supplied compressed gas to a target value that is set by the control device 100 and outputs the pressure. The electro-pneumatic regulators $R_1$ and $R_5$ are examples of a compression adjustment unit and a pre-compression adjustment unit, respectively.

The supply source A is connected to the upstream end of the supply path $P_1$. The downstream end of the supply path $P_1$ is connected to the upstream end of each of the reference path $P_2$ and the common inspection path $P_3$. The downstream end of the reference path $P_2$ is connected to a reference chamber m, which is a sealed space formed in the master M. The downstream end of the common inspection path $P_3$ is connected to the upstream end of each of the branch inspection paths $P_{41}$ to $P_{43}$. The downstream ends of the branch inspection paths $P_{41}$ to $P_{43}$ are connected to inspection chambers $w_1$ to $w_3$, respectively, which are sealed spaces formed in a work W. The upstream end of the common pre-compression path $P_5$ is connected to the upstream side of the supply valve $V_1$ of the supply path $P_1$. The downstream end of the common pre-compression path $P_5$ is connected to the branch pre-compression paths $P_{61}$ to $P_{63}$ branched from the common pre-compression path $P_5$. The downstream ends of the branch pre-compression paths $P_{61}$ to $P_{63}$ are connected to the downstream sides of the inspection valves $V_{41}$ to $V_{43}$ of the branch inspection paths $P_{41}$ to $P_{43}$, respectively.

The differential pressure sensor S to be described below measures a differential pressure between the inside of the reference path $P_2$ on the downstream side of the reference valve $V_2$ and the inside of the common inspection path $P_3$ on the downstream side of the common inspection valve $V_3$. The differential pressure sensor S measures a differential pressure between the inside of the reference chamber m and the inside of any one of the inspection chambers $w_1$ to $w_3$ according to open/closed states of the reference valve $V_2$, the common inspection valve $V_3$, the inspection valves $V_{41}$ to $V_{43}$, and the pre-compression valves $V_{61}$ to $V_{63}$. The differential pressure sensor S is an example of a measurement unit. The control device 100 acquires a measured value of the differential pressure sensor S, and based on the value, inspects any of the inspection chambers $w_1$ to $w_3$, which are targets to be inspected, for a pressure leak. As such, since the single differential pressure sensor S can measure a plurality of inspection chambers $w_1$ to $w_3$, as compared with a case where a dedicated differential pressure sensor is provided in each of the inspection chambers $w_1$ to $w_3$, it is possible to restrict a decrease in accuracy due to the variation in precision of measuring each differential pressure sensor. However, in the example illustrated in FIG. 1, the inspection chambers $w_1$ to $w_3$ are formed as different sealed spaces in the single work W, and their volumes may be the same as or different from each other.

Inspection Method

Figure 2:
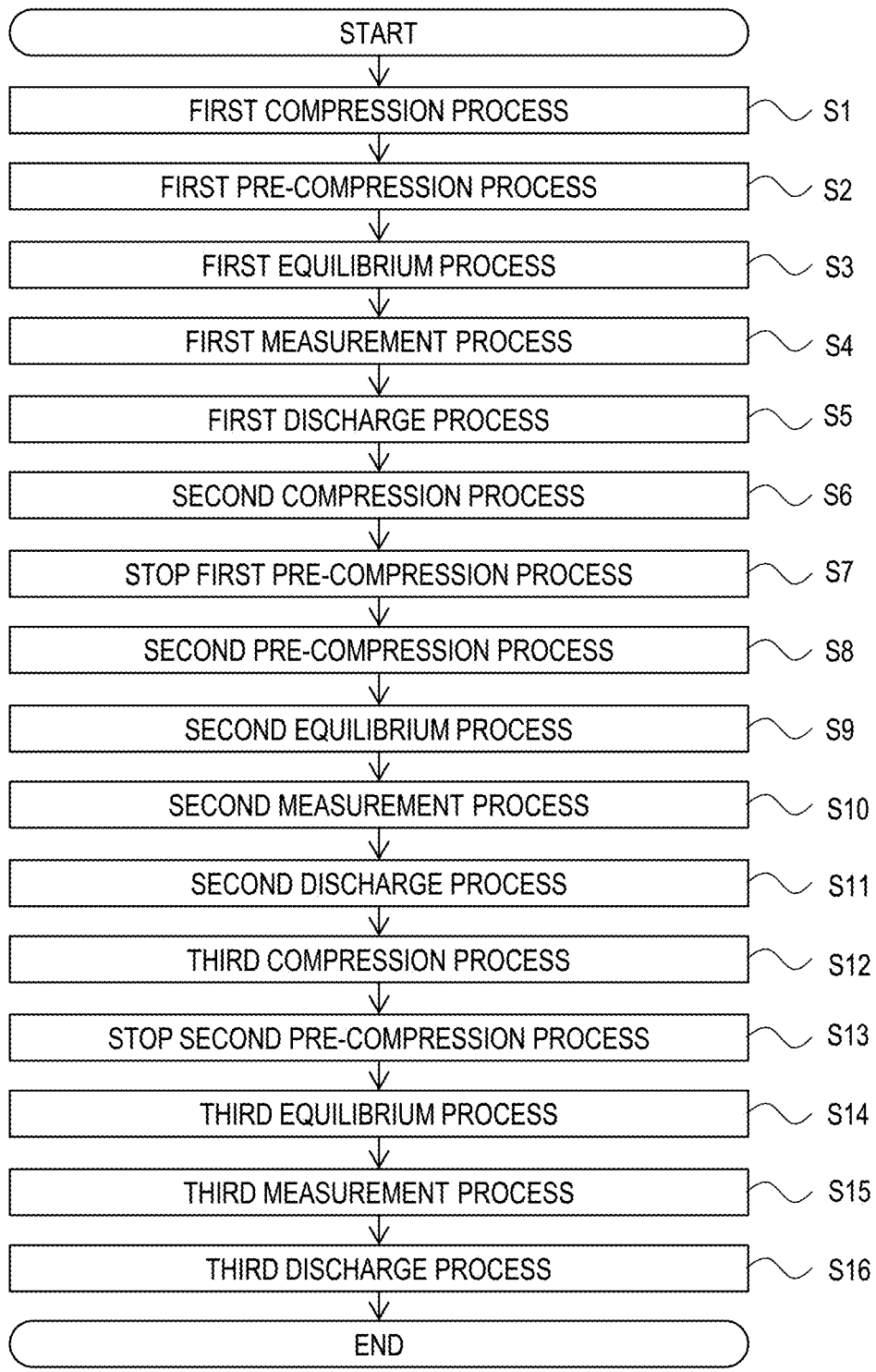
FIG. 2 is a flowchart illustrating an example of a process executed by a control device.

Next, an inspection method will be described. FIG. 2 is a flowchart illustrating an example of a process executed by the control device 100. First, the control device 100 executes a first inspection process for inspecting the inspection chamber $w_1$. The first inspection process includes a first compression process (step S1), a first equilibrium process (step S3), and a first measurement process (step S4) to be described below. Further, during the execution of the first inspection process, a first pre-compression process (step S2) to be described below is executed. Next, the control device 100 executes a second inspection process for inspecting the inspection chamber $w_2$. Similar to the first inspection process, the second inspection process includes a second compression process (step S6), a second equilibrium process (step S9), and a second measurement process (step S10). Further, during the execution of the second inspection process, a second pre-compression process (step S8) to be described below is executed. Then, the control device 100 executes a third inspection process for inspecting the inspection chamber $w_3$. Similar to the first inspection process, the third inspection process includes a third compression process (step S12), a third equilibrium process (step S14), and a third measurement process (step S15). The above processes will be described below in detail.

First Compression Process, First Pre-Compression Process

Figure 3:
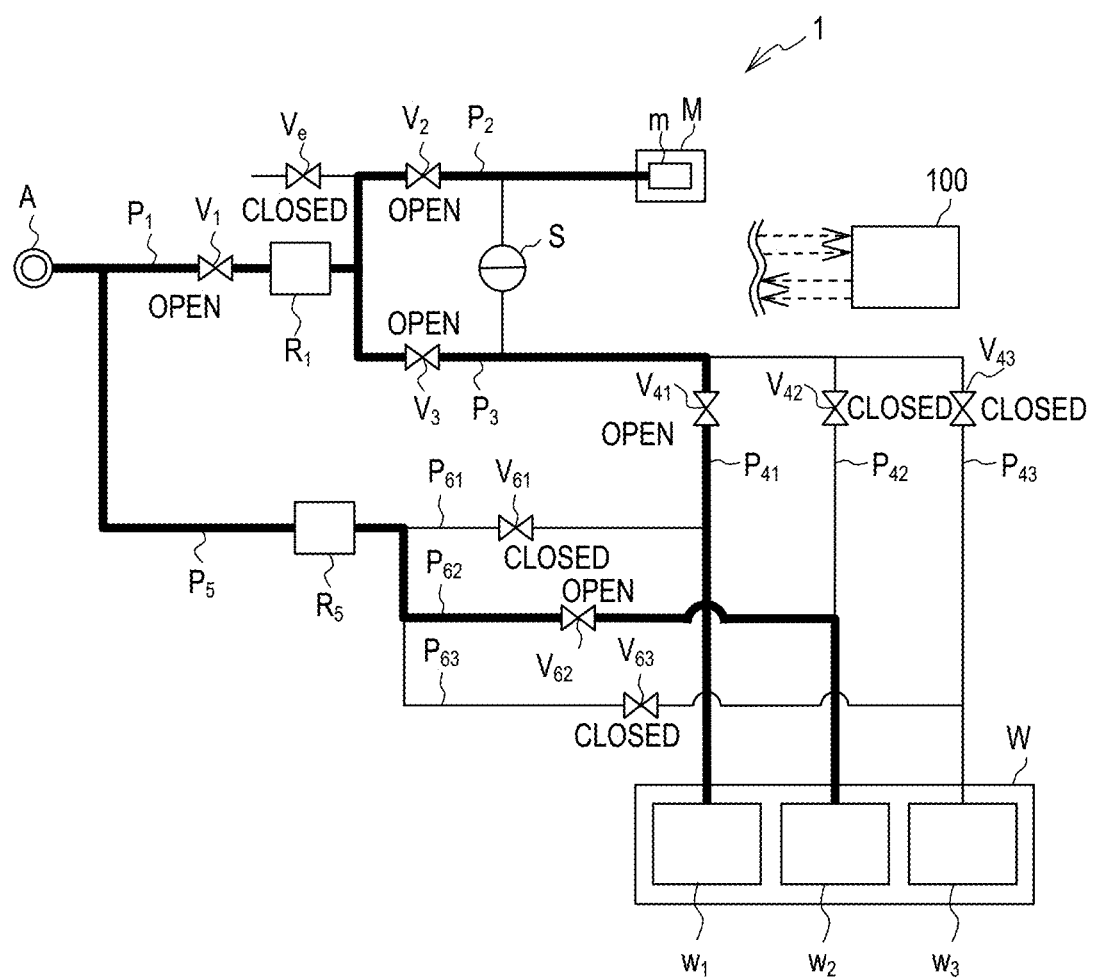
FIG. 3 illustrates open/closed states of valves during executions of a first compression process and a first pre-compression process.

First, the control device 100 executes the first compression process for compressing the insides of the inspection chamber $w_1$ and the reference chamber m (step S1) almost at the same time as executing the first pre-compression process for pre-compressing the inside of the inspection chamber $w_2$ (step S2). FIG. 3 illustrates the open/closed states of the valves during the executions of the first compression process and the first pre-compression process. In the first compression process, the supply valve $V_1$, the reference valve $V_2$, the common inspection valve $V_3$, and the inspection valve $V_{41}$ (also referred to as a "first inspection valve") are opened, and the inspection valves $V_{42}$, $V_{43}$ and the discharge valve $V_e$ are closed. As a result, the compressed gas is supplied from the supply source A to the reference chamber m and the inspection chamber $w_1$ via the supply path $P_1$, the reference path $P_2$, the common inspection path $P_3$, and the branch inspection path $P_{41}$ (also referred to as a "first inspection path"). Moreover, in the first compression process, the control device 100 sets a target value of the electro-pneumatic regulator $R_1$ to a first compression target value. After a predetermined time elapses in this state, the pressures inside the reference path $P_2$, the common inspection path $P_3$, the branch inspection path $P_{41}$, the reference chamber m, and the inspection chamber $w_1$, which are on the downstream side of the electro-pneumatic regulator $R_1$, are maintained at the first compression target value.

In the first pre-compression process, the pre-compression valve $V_{62}$ (also referred to as a "first pre-compression valve") is opened and the pre-compression valves $V_{61}$, $V_{63}$ are closed. Here, as described above, the inspection valve $V_{42}$ is in the closed state. As a result, the compressed gas is supplied from the supply source A to the inspection chamber $w_2$ via the common pre-compression path $P_5$, the branch pre-compression path $P_{62}$ (also referred to as a "first branch pre-compression path"), and the downstream side of the inspection valve $V_{42}$ of the branch inspection path $P_{42}$. (The path for supplying the compressed gas, through the common pre-compression path $P_5$, the branch pre-compression path $P_{62}$, and the downstream side of the inspection valve $V_{42}$ of the branch inspection path $P_{42}$, to pre-compress the inspection chamber $w_2$ in the first pre-compression process is also referred to as a "first pre-compression path"). In the first pre-compression process, the control device 100 sets a target value of the electro-pneumatic regulator $R_5$ to a first pre-compression target value. After a predetermined time elapses in this state, a pressure inside the branch pre-compression path $P_{62}$ on the downstream side of the electro-pneumatic regulator $R_5$, a pressure on the downstream side of the inspection valve $V_{42}$ of the branch inspection path $P_{42}$, and a pressure inside the inspection chamber $w_2$ are maintained at the first pre-compression target value. As such, the compression of the insides of the inspection chamber $w_1$ and the reference chamber m, and the pre-compression of the inside of the inspection chamber $w_2$ can be executed at the same time.

First Equilibrium Process

Figure 4:
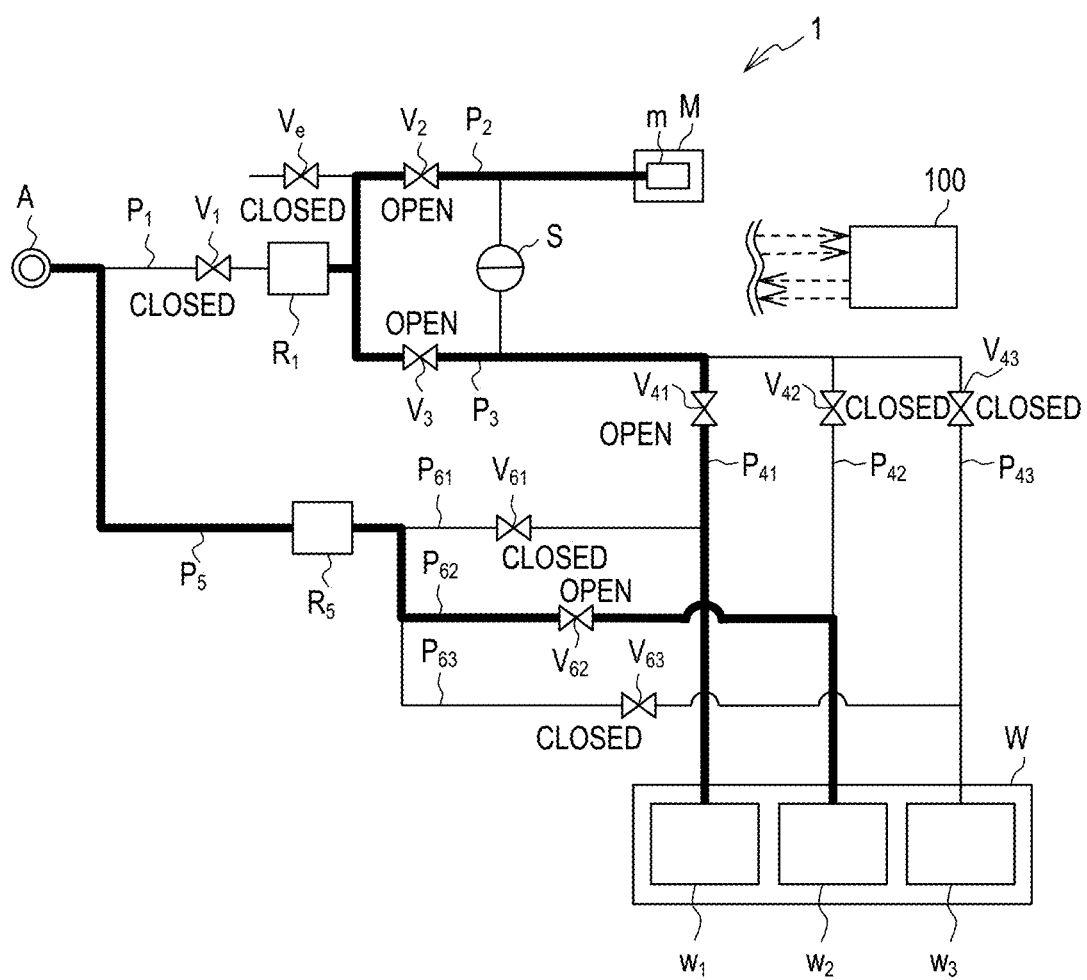
FIG. 4 illustrates the open/closed states of the valves during executions of a first equilibrium process and the first pre-compression process.

Next, the control device 100 executes the first equilibrium process for equilibrating the pressure inside the inspection chamber $w_1$ and a pressure inside the reference chamber m (step S3). FIG. 4 illustrates the open/closed states of the valves during the executions of the first equilibrium process and the first pre-compression process. In the first equilibrium process, the supply valve $V_1$ that has been in the open state in the first compression process is closed. As a result, the inside of the inspection chamber w and the inside of the reference chamber m are separated from the supply source A, and the pressures inside the inspection chamber $w_1$ and the reference chamber m have substantially the same value. Here, the first equilibrium process is executed after a pressure on the downstream side of the electro-pneumatic regulator $R_1$ reaches the first compression target value in the first compression process. In order to determine whether the pressure on the downstream side of the electro-pneumatic regulator $R_1$ has reached the first compression target value, a required time period from the time when the first compression process is executed to the time when the pressure reaches the first compression target value may be measured in advance by experiments or the like. When a time period from the time when the first compression process is executed exceeds the required time period, it may be determined that the pressure on the downstream side of the electro-pneumatic regulator $R_1$ has reached the first compression target value. Alternatively, whether the pressure on the downstream side of the electro-pneumatic regulator $R_1$ has reached the first compression target value may be determined based on, for example, a detection value of a pressure sensor that is provided on the reference path $P_2$, the common inspection path $P_3$, the downstream side of the electro-pneumatic regulator $R_1$ of the supply path $P_1$, or the like, and detects the pressure on the downstream side of the electro-pneumatic regulator $R_1$. FIG. 4 illustrates a case where the first pre-compression process is continued even during the execution of the first equilibrium process. However, when the pressure inside the inspection chamber $w_2$ is already maintained at the first pre-compression target value, the first pre-compression process may be ended by closing the pre-compression valve $V_{62}$.

First Measurement Process

Figure 5:
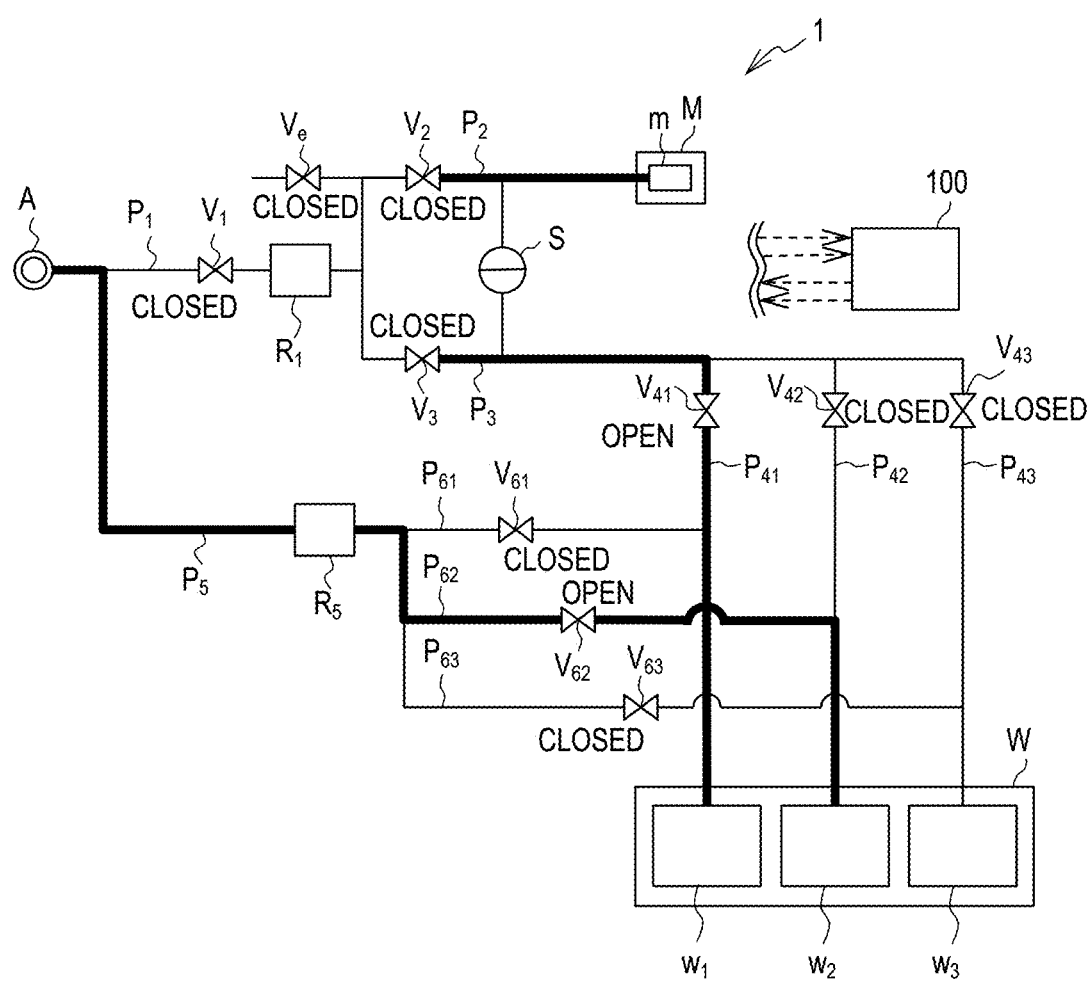
FIG. 5 illustrates the open/closed states of the valves during executions of a first measurement process and the first pre-compression process.

Next, the control device 100 executes the first measurement process for measuring a differential pressure between the inside of the inspection chamber $w_1$ and the inside of the reference chamber m using the differential pressure sensor S (step S4). FIG. 5 illustrates the open/closed states of the valves during the executions of the first measurement process and the first pre-compression process. In the first measurement process, the reference valve $V_2$ and the common inspection valve $V_3$ that have been in the open state in the first equilibrium process are closed. As a result, the inside of the inspection chamber $w_1$ and the inside of the reference chamber m are separated from each other. In this state, the pressures inside the reference path $P_2$ and reference chamber m, which are on the downstream side of the reference valve $V_2$, are the same and the pressures inside the common inspection path $P_3$, the branch inspection path $P_{41}$, and the inspection chamber $w_1$, which are on the downstream side of the common inspection valve $V_3$, are the same, and thus the differential pressure between the inside of the reference chamber m and the inside of the inspection chamber $w_1$ can be measured by measuring the differential pressure between the inside of the reference path $P_2$ and the inside of the common inspection path $P_3$ using the differential pressure sensor S. When there is no pressure leak from the inspection chamber $w_1$, the differential pressure hardly changes. On the other hand, when there is a pressure leak from the inspection chamber $w_1$, the pressure inside the inspection chamber $w_1$ gradually decreases as time elapses, and thus the absolute value of the differential pressure between the inside of the reference chamber m and the inside of inspection chamber $w_1$ gradually increases. The control device 100 can determine whether there is a pressure leak from the inspection chamber $w_1$ based on such a change in the differential pressure. FIG. 5 illustrates a case where the first pre-compression process is continued even during the execution of the first measurement process. However, when the pressure inside the inspection chamber $w_2$ is already maintained at the first pre-compression target value, the first pre-compression process may be ended.

First Discharge Process

Figure 6:
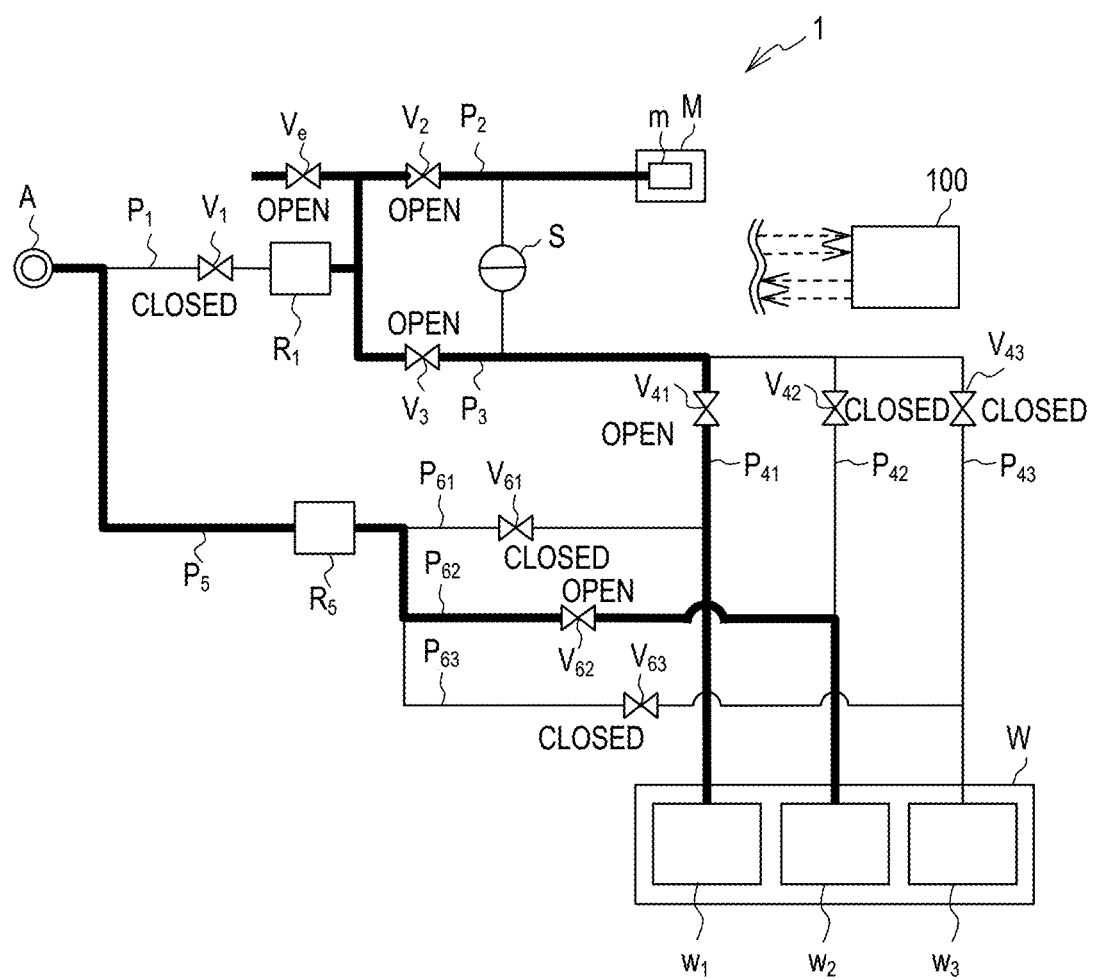
FIG. 6 illustrates the open/closed states of the valves during executions of a first discharge process and the first pre-compression process.

Next, the control device 100 executes a first discharge process for discharging the compressed gas from the inspection chamber $w_1$ and the reference chamber m (step S5). FIG. 6 illustrates the open/closed states of the valves during the executions of the first discharge process and the first pre-compression process. In the first discharge process, the reference valve $V_2$, the common inspection valve $V_3$, and the discharge valve $V_e$ that have been in the closed state in the first measurement process are opened. As a result, the compressed gas inside the reference path $P_2$, the common inspection path $P_3$, the branch inspection path $P_{41}$, the reference chamber m, and the inspection chamber $w_1$ escapes to the outside. FIG. 6 illustrates a case where the first pre-compression process is continued even during the execution of the first discharge process. However, when the pressure inside the inspection chamber $w_2$ is already maintained at the first pre-compression target value, the first pre-compression process may be ended.

Second Compression Process, Second Pre-Compression Process

Figure 7:
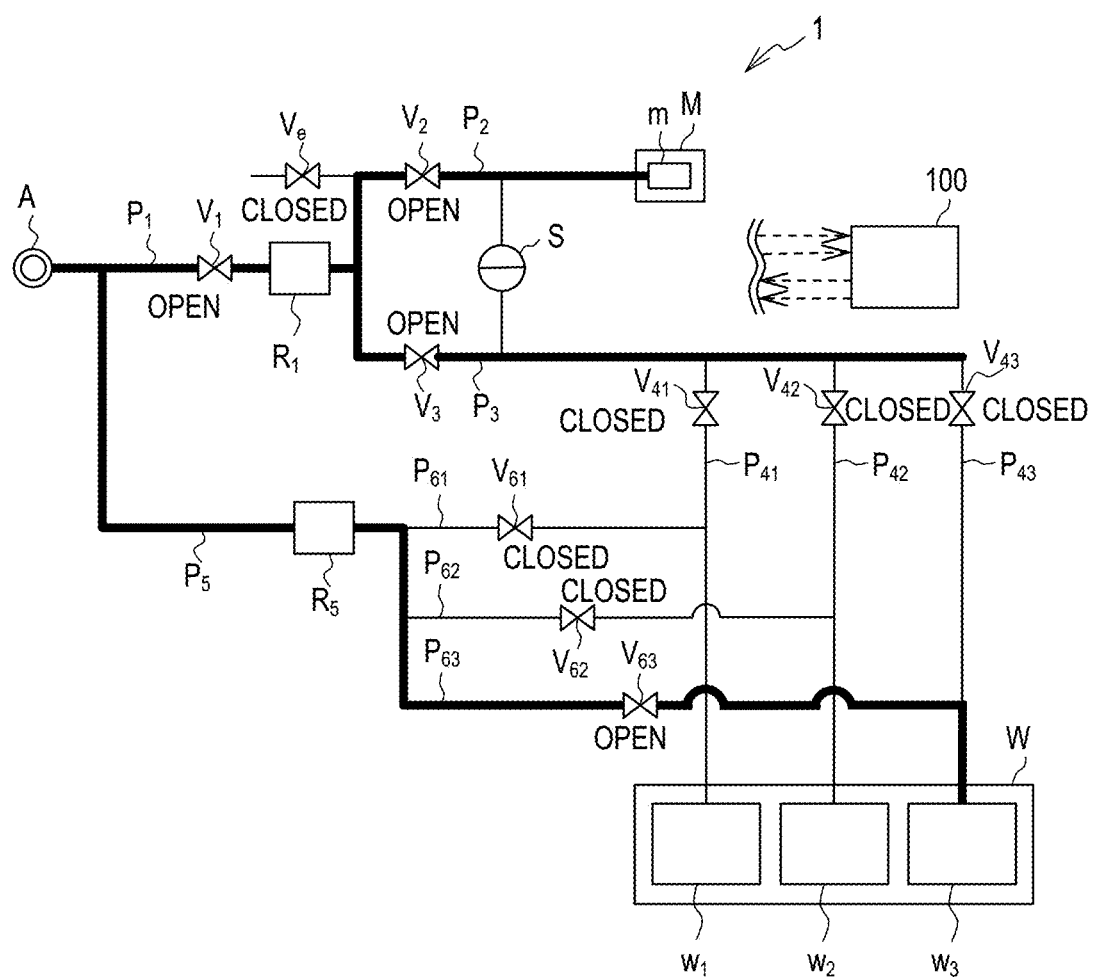
FIG. 7 illustrates the open/closed states of the valves during executions of a first half of a second compression process and a second pre-compression process.

Next, the control device 100 executes the second compression process for compressing the insides of the inspection chamber $w_2$ and the reference chamber m (step S6) almost at the same as stopping the first pre-compression process (step S7), and then executes the second pre-compression process for pre-compressing the inside of the inspection chamber $w_3$ (step S8). The first pre-compression process is stopped by closing the pre-compression valve $V_{62}$. FIG. 7 illustrates the open/closed states of the valves during the executions of a first half of the second compression process and the second pre-compression process. In the first half of the second compression process, the discharge valve $V_e$ and the inspection valve $V_{41}$ that have been in the open state in the first discharge process are closed, and the supply valve $V_1$ that has been in the closed state in the first discharge process is opened. Here, since the inspection valve $V_{42}$ is in the closed state, the compressed gas is not supplied to the inspection chamber $w_2$. On the other hand, the reference valve $V_2$ and the common inspection valve $V_3$ are in the open state, the compressed gas is supplied to the reference path $P_2$, the common inspection path $P_3$, and the reference chamber m. Further, in the second compression process, the control device 100 sets the target value of the electro-pneumatic regulator $R_1$ to a second compression target value. After a predetermined time elapses in this state, the pressures inside the reference path $P_2$, the common inspection path $P_3$, and the reference chamber m, which are on the downstream side of the electro-pneumatic regulator $R_1$, are maintained at the second compression target value. The first compression target value and the second compression target value may be the same as or different from each other.

In the second pre-compression process, the pre-compression valve $V_{62}$ that has been in the open state in the first pre-compression process is closed and the pre-compression valve $V_{63}$ (also referred to as a "second pre-compression valve") that has been in the closed state in the first pre-compression process is opened. As a result, the compressed gas is supplied from the supply source A to the inspection chamber $w_3$ via the common pre-compression path $P_5$, the branch pre-compression path $P_{63}$ (also referred to as a "second branch pre-compression path"), and the downstream side of the inspection valve $V_{43}$ of the branch inspection path $P_{43}$. (The path for supplying the compressed gas, through the common pre-compression path $P_5$, the branch pre-compression path $P_{63}$, and the downstream side of the inspection valve $V_{43}$ of the branch inspection path $P_{43}$, to pre-compress the inspection chamber $w_3$ in the second pre-compression process is also referred to as a "second pre-compression path").

Figure 8:
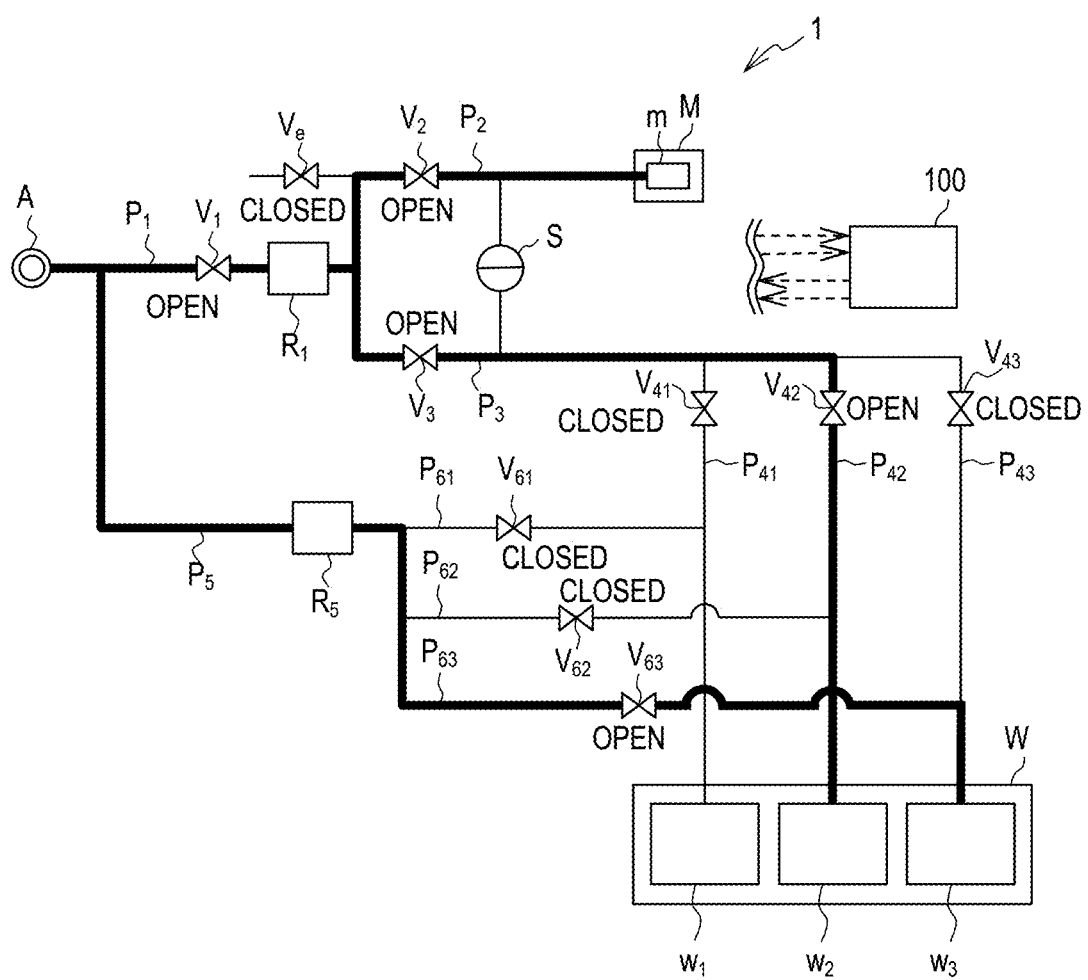
FIG. 8 illustrates the open/closed states of the valves during executions of a second half of the second compression process and the second pre-compression process.

FIG. 8 illustrates the open/closed states of the valves during the executions of a second half of the second compression process and the second pre-compression process. In the second half of the second compression process, the inspection valve $V_{42}$ (also referred to as a "second inspection valve") that has been in the closed state in the first half of the second compression process is opened. Here, since the inside of the inspection chamber $w_2$ has already been pre-compressed in the above-described first pre-compression process, a time period from the time when the second compression process is executed to the time when the pressures inside the reference chamber m and the inspection chamber $w_2$ reach desired pressures and the second compression process is ended is reduced. In the above description, a time period from the start of the second compression process to any time point during the execution of the second compression process is referred to as the first half of the second compression process, and a time period from the above any time point to the end of the second compression process is referred to as the second half of the second compression process. The above any time point is not limited to an intermediate time point of the time period during the execution of the second compression process.

Second Equilibrium Process

Figure 9:
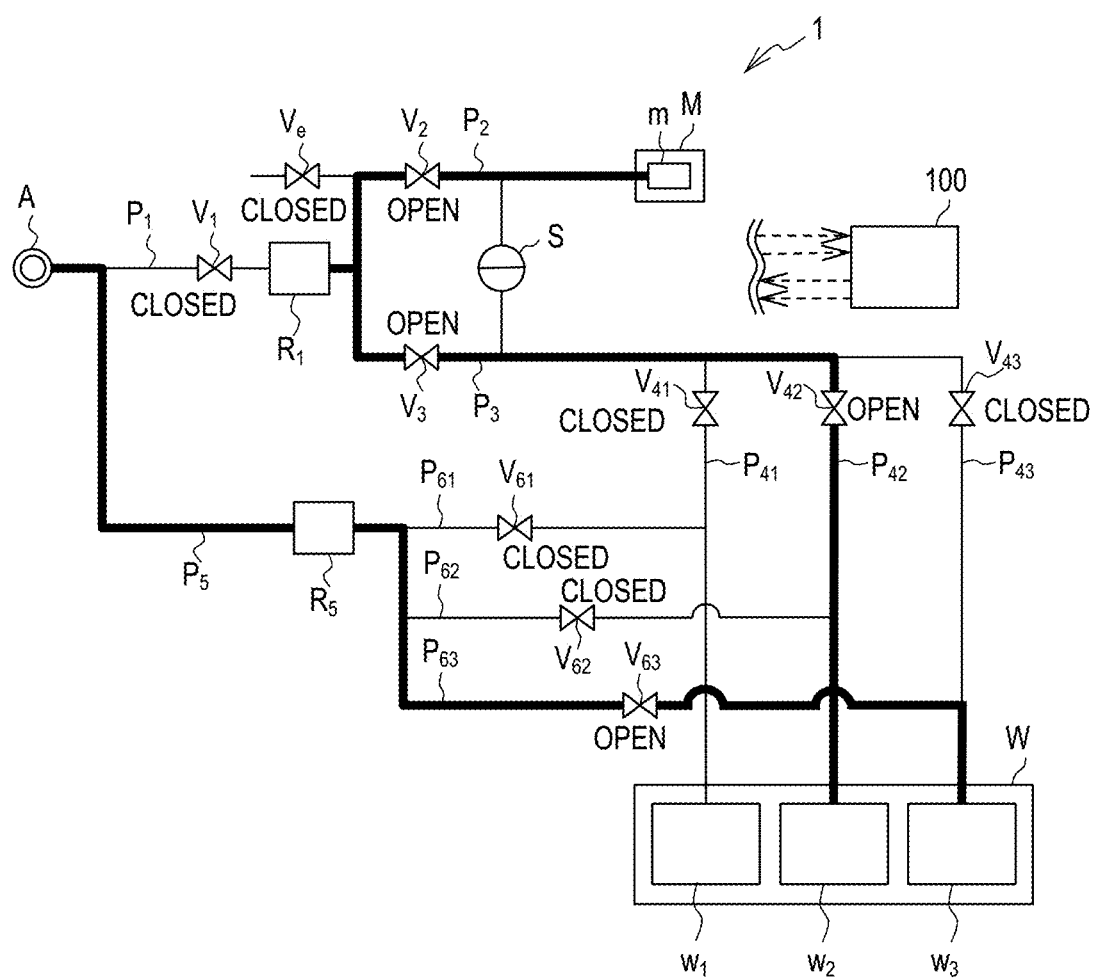
FIG. 9 illustrates the open/closed states of the valves during executions of a second equilibrium process and the second pre-compression process.

Next, the control device 100 executes the second equilibrium process for equilibrating the pressure inside the inspection chamber $w_2$ and the pressure inside the reference chamber m (step S9). FIG. 9 illustrates the open/closed states of the valves during the executions of the second equilibrium process and the second pre-compression process. In the second equilibrium process, the supply valve $V_1$ that has been in the open state in the second compression process is closed. As a result, the inside of the inspection chamber $w_2$ and the inside of the reference chamber m are separated from the supply source A, and the pressures inside the inspection chamber $w_2$ and the reference chamber m have substantially the same value. Here, the second equilibrium process is executed after the pressure on the downstream side of the electro-pneumatic regulator $R_1$ reaches the second compression target value in the second compression process. Similar to the case described above, whether the pressure on the downstream side of the electro-pneumatic regulator $R_1$ has reached the second compression target value may be determined based on the elapsing time since the second compression process is executed or based on a detection value of a pressure sensor provided on the reference path $P_2$, the common inspection path $P_3$, or the downstream side of the electro-pneumatic regulator $R_1$ of the supply path $P_1$. FIG. 9 illustrates a case where the second pre-compression process is continued even during the execution of the second equilibrium process. However, when a pressure inside the inspection chamber $w_3$ is already maintained at the second pre-compression target value, the second pre-compression process may be ended by closing the pre-compression valve $V_{63}$.

Second Measurement Process

Figure 10:
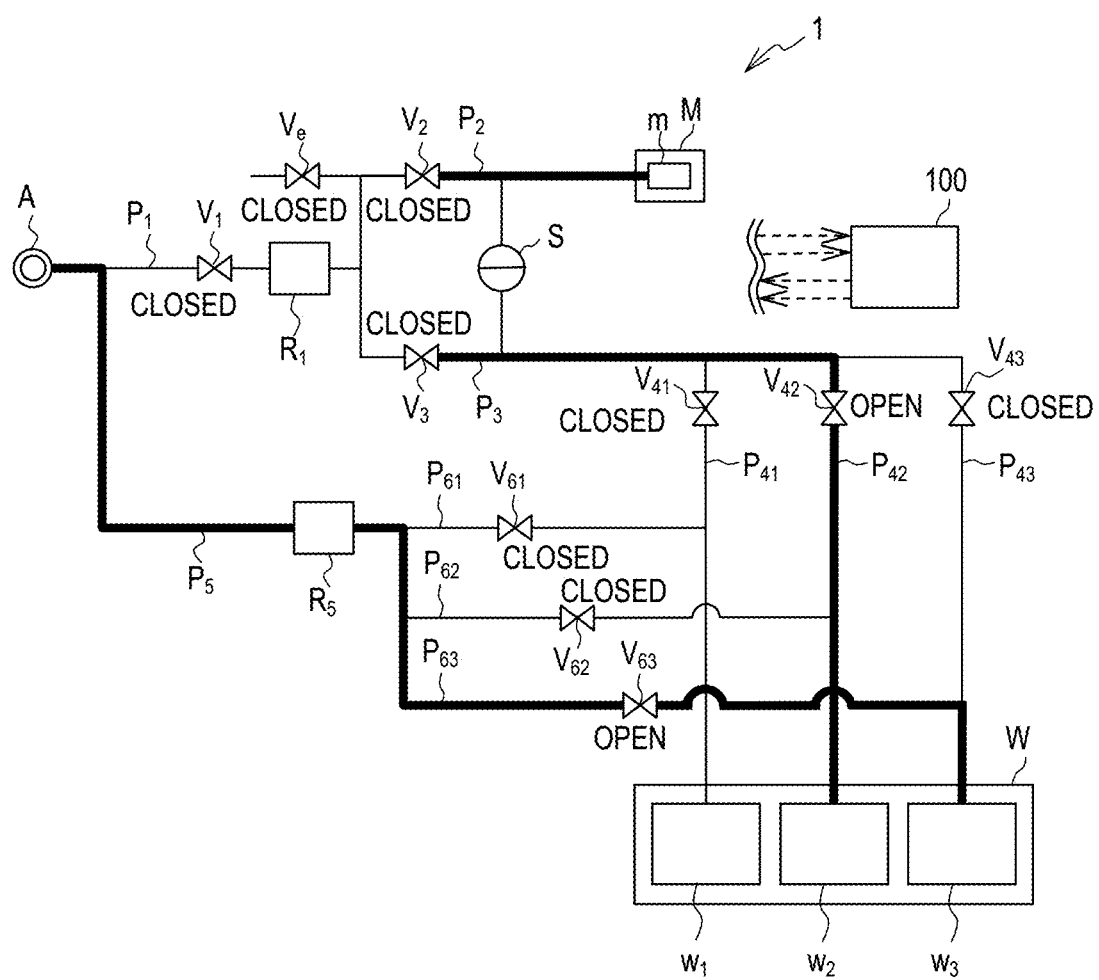
FIG. 10 illustrates the open/closed states of the valves during executions of a second measurement process and the second pre-compression process.

Next, the control device 100 executes the second measurement process for measuring a differential pressure between the inside of the inspection chamber w2 and the inside of the reference chamber m using the differential pressure sensor S (step S10). FIG. 10 illustrates the open/closed states of the valves during the executions of the second measurement process and the second pre-compression process. In the second measurement process, the reference valve V2 and the common inspection valve $V_3$ that have been in the open state in the second equilibrium process are closed. As a result, the inside of the inspection chamber $w_2$ and the inside of the reference chamber m are separated from each other. In this state, the pressures inside the reference path $P_2$ and the reference chamber m, which are on the downstream side of the reference valve $V_2$, are the same and the pressures inside the common inspection path $P_3$, the branch inspection path $P_{42}$ (also referred to as a "second inspection path"), and the inspection chamber $w_2$, which are on the downstream side of the common inspection valve $V_3$, are the same, and thus the differential pressure between the inside of the reference chamber m and the inside of the inspection chamber $w_2$ can be measured by measuring the differential pressure between the inside of the reference path $P_2$ and the inside of the common inspection path $P_3$ using the differential pressure sensor S. When there is no pressure leak from the inspection chamber $w_2$, the differential pressure hardly changes. On the other hand, when there is a pressure leak from the inspection chamber $w_2$, the absolute value of the differential pressure gradually increases. The control device 100 can determine whether there is a pressure leak from the inspection chamber $w_2$ based on such a change in the differential pressure. FIG. 10 illustrates a case where the second pre-compression process is continued even during the execution of the second measurement process. However, when the pressure inside the inspection chamber $w_3$ is already maintained at the second pre-compression target value, the second pre-compression process may be ended.

Second Discharge Process

Figure 11:
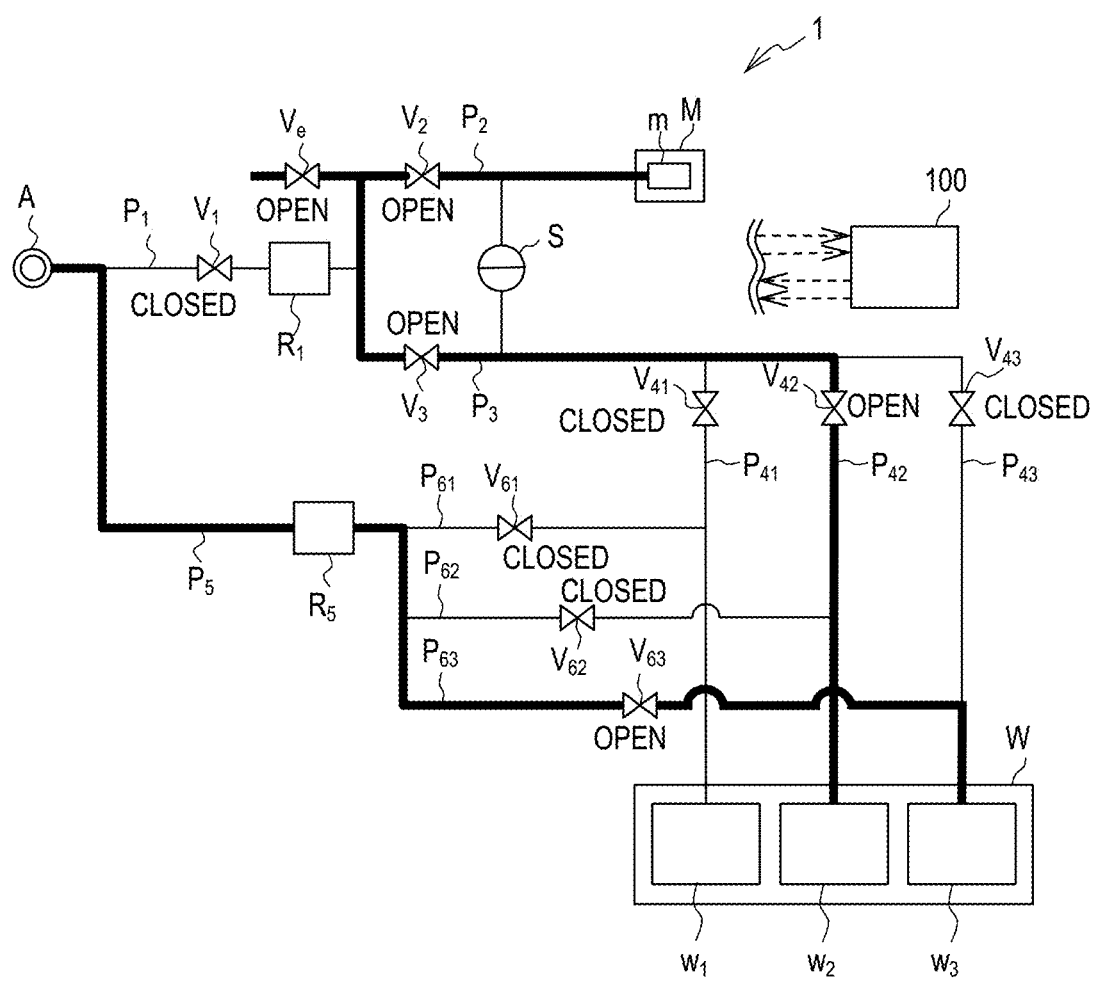
FIG. 11 illustrates the open/closed states of the valves during executions of a second discharge process and the second pre-compression process.

Next, the control device 100 executes a second discharge process for discharging the compressed gas from the inspection chamber $w_2$ and the reference chamber m (step S11). FIG. 11 illustrates the open/closed states of the valves during the executions of the second discharge process and the second pre-compression process. In the second discharge process, the reference valve $V_2$, the common inspection valve $V_3$, and the discharge valve $V_e$ that have been in the closed state in the second measurement process are opened. As a result, the compressed gas inside the reference path $P_2$, the common inspection path $P_3$, the branch inspection path $P_{42}$, the reference chamber m, and the inspection chamber $w_2$ is discharged to the outside. FIG. 11 illustrates a case where the second pre-compression process is continued even during the execution of the second discharge process. However, when the pressure inside the inspection chamber $w_3$ is already maintained at the second pre-compression target value, the second pre-compression process may be ended.

Third Compression Process

Figure 12:
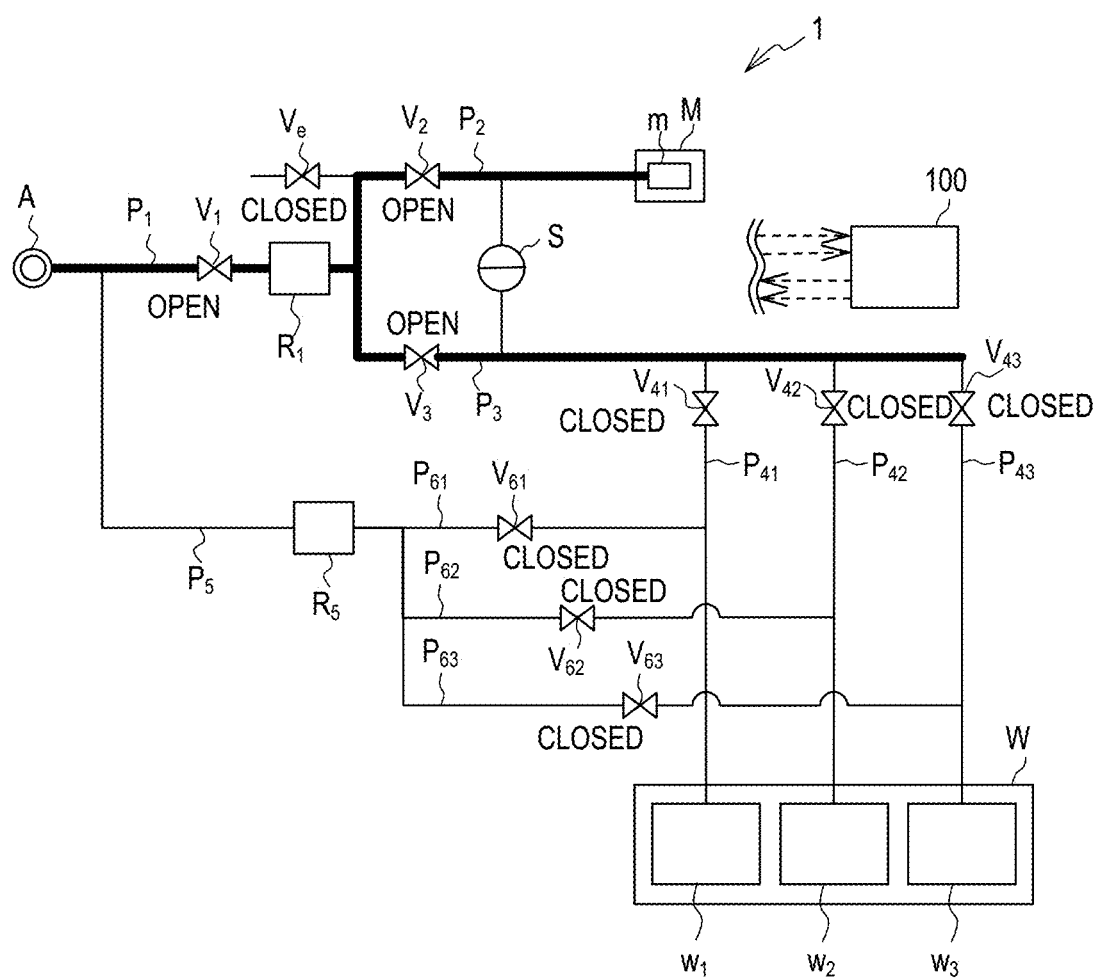
FIG. 12 illustrates the open/closed states of the valves during an execution of a first half of a third compression process.

Next, the control device 100 executes the third compression process for compressing the insides of the inspection chamber $w_3$ and the reference chamber m (step S12). The second pre-compression process is stopped almost at the same time as the start of the third compression process (step S13). The second pre-compression process is stopped by closing the pre-compression valve $V_{63}$. FIG. 12 illustrates the open/closed states of the valves during the execution of a first half of the third compression process. In the first half of the third compression process, the discharge valve $V_e$ and the inspection valve $V_{42}$ that have been in the open state in the second discharge process are closed, and the supply valve $V_1$ that has been in the closed state in the second discharge process is opened. Similar to the second compression process, since the inspection valve $V_{43}$ is in the closed state, the compressed gas is not supplied to the inspection chamber $w_3$. On the other hand, since the reference valve $V_2$ and the common inspection valve $V_3$ are in the open state, the compressed gas is supplied to the reference path $P_2$, the common inspection path $P_3$, and the reference chamber m. Further, in the third compression process, the control device 100 sets the target value of the electro-pneumatic regulator $R_1$ to a third compression target value. After a predetermined time elapses in this state, the pressures inside the reference path $P_2$, the common inspection path $P_3$, and the reference chamber m, which are on the downstream side of the electro-pneumatic regulator $R_1$, are maintained at the third compression target value. The third compression target value may be the same as or different from at least one of the first and the second compression target values.

Figure 13:
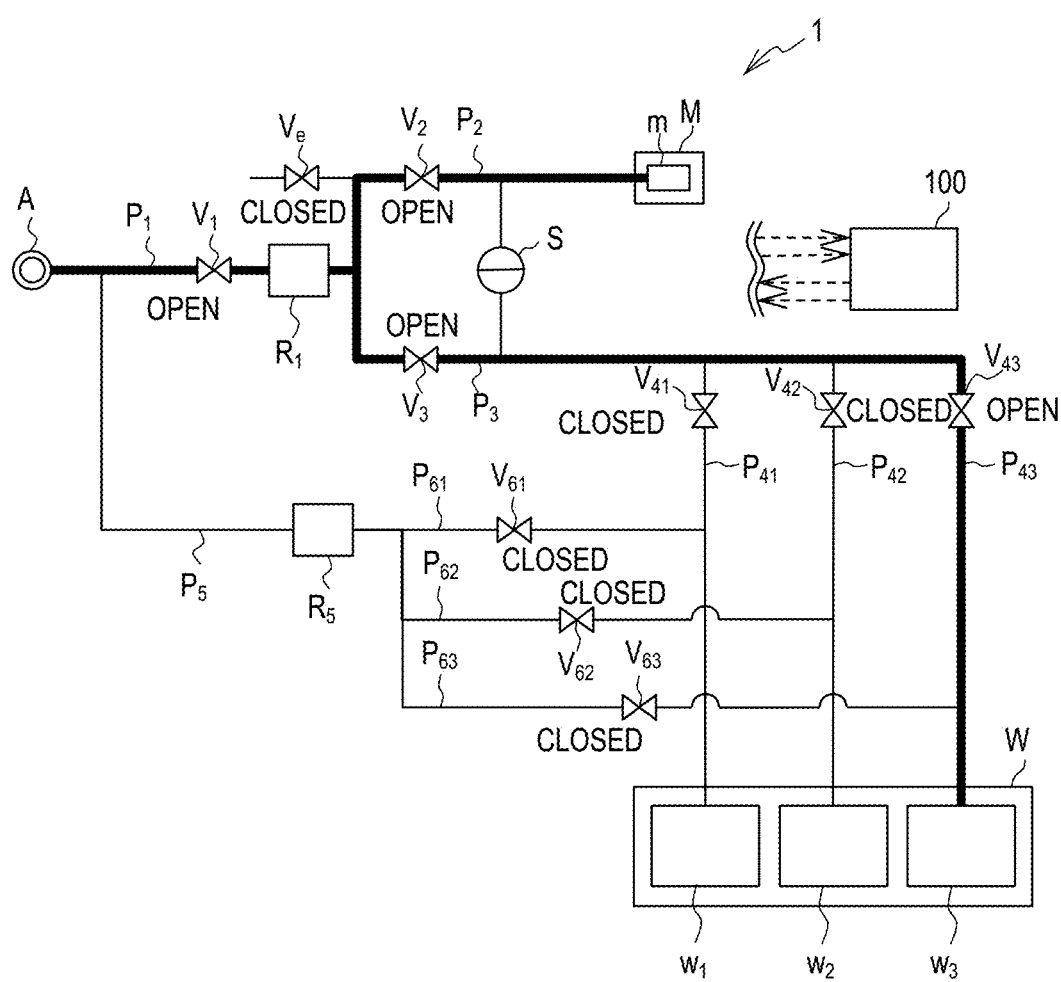
FIG. 13 illustrates the open/closed states of the valves during an execution of a second half of the third compression process.

FIG. 13 illustrates the open/closed states of the valves during the execution of a second half of the third compression process. In the second half of the third compression process, the inspection valve $V_{43}$ that has been in the closed state in the first half of the third compression process is opened. Here, since the inside of the inspection chamber $w_3$ has already been pre-compressed in the above-described second pre-compression process, a time period from the time when the third compression process is executed to the time when the pressures inside the reference chamber m and the inspection chamber $w_3$ reach desired pressures and the third compression process is ended is reduced. In the above description, a time period from the start of the third compression process to any time point during the execution of the third compression process is referred to as the first half of the third compression process, and a time period from the above any time point to the end of the third compression process is referred to as the second half of the third compression process. The above any time point is not limited to an intermediate time point of the time period during the execution of the third compression process.

Third Equilibrium Process

Figure 14:
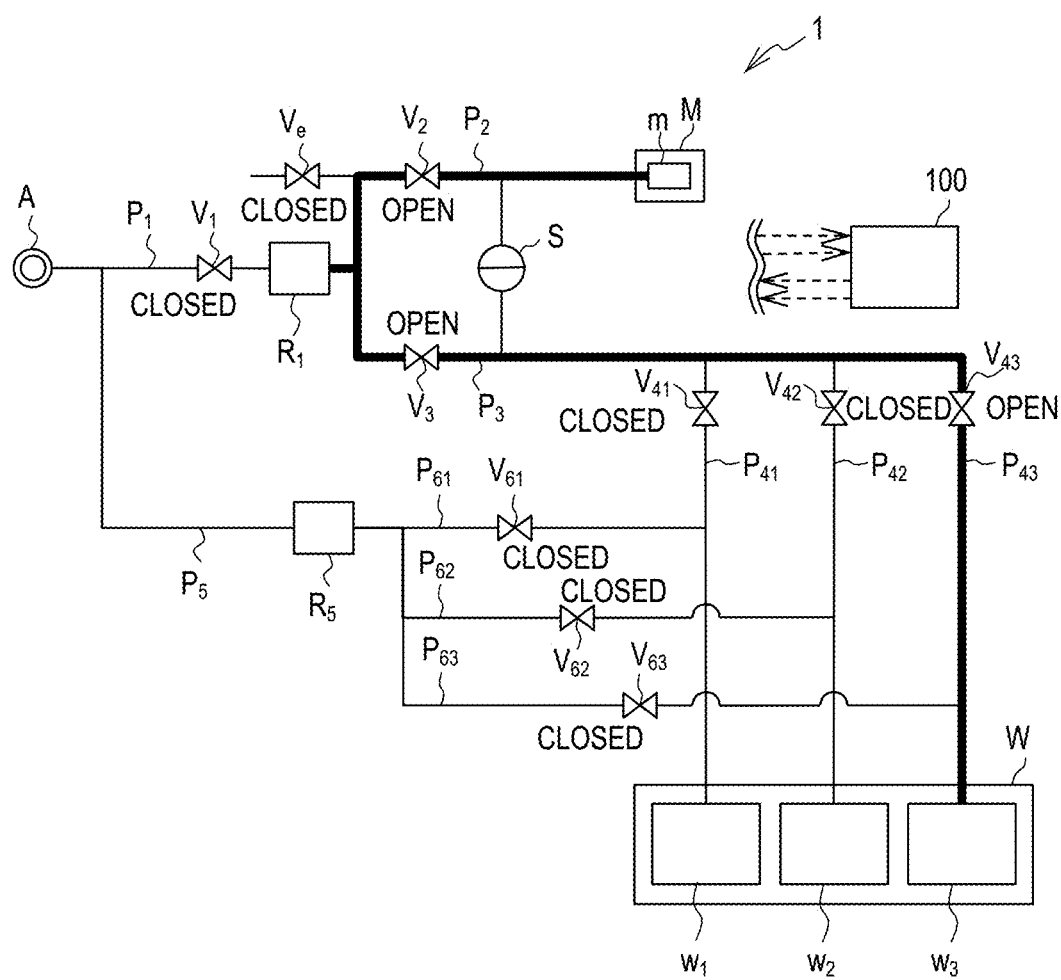
FIG. 14 illustrates the open/closed states of the valves during an execution of a third equilibrium process.

Next, the control device 100 executes the third equilibrium process for equilibrating the pressure inside the inspection chamber $w_3$ and the pressure inside the reference chamber m (step S14). FIG. 14 illustrates the open/closed states of the valves during the execution of the third equilibrium process. In the third equilibrium process, the supply valve $V_1$ that has been in the open state in the third compression process is closed. As a result, the inside of the inspection chamber $w_3$ and the inside of the reference chamber m are separated from the supply source A, and the pressures inside the inspection chamber $w_3$ and the reference chamber m have substantially the same value.

Third Measurement Process

Figure 15:
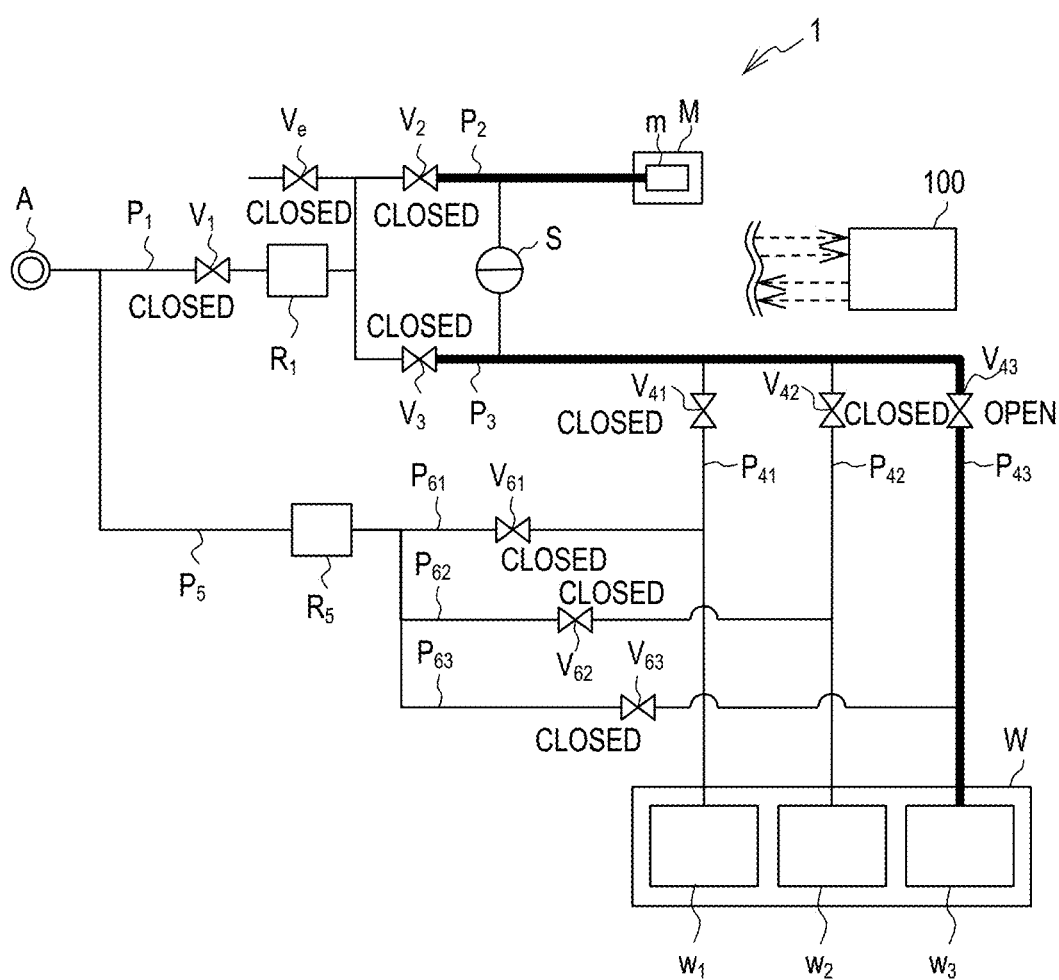
FIG. 15 illustrates the open/closed states of the valves during an execution of a third measurement process.

Next, the control device 100 executes the third measurement process for measuring a differential pressure between the inside of the inspection chamber $w_3$ and the inside of the reference chamber m using the differential pressure sensor S (step S15). FIG. 15 illustrates the open/closed states of the valves during the execution of the third measurement process. In the third measurement process, the reference valve $V_2$ and the common inspection valve $V_3$ that have been in the open state in the third equilibrium process are closed. As a result, the differential pressure between the inside of the reference chamber m and the inside of the inspection chamber $w_3$ can be measured by measuring the differential pressure between the inside of the reference path $P_2$ and the inside of the common inspection path $P_3$ using the differential pressure sensor S. The control device 100 can determine whether there is a pressure leak from the inspection chamber $w_3$ based on a change in the differential pressure.

Third Discharge Process

Figure 16:
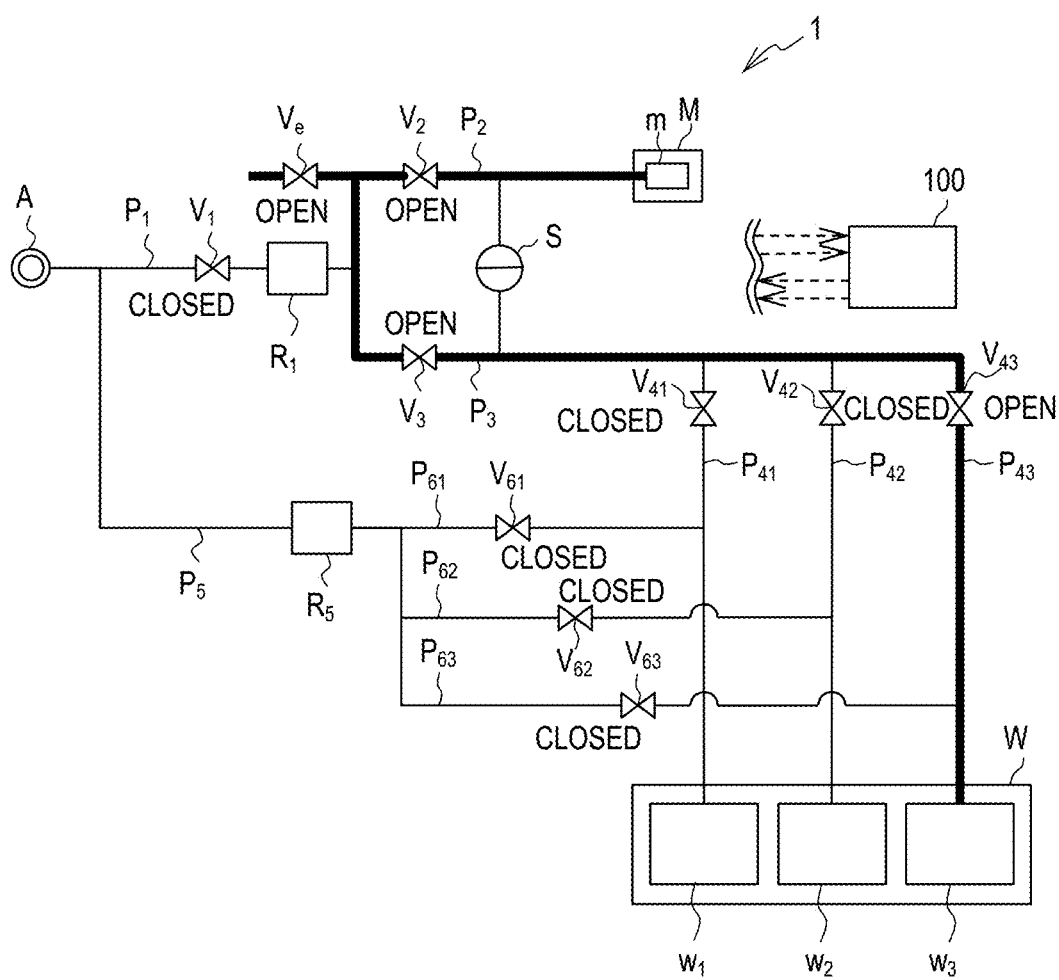
FIG. 16 illustrates the open/closed states of the valves during an execution of a third discharge process.

Next, the control device 100 executes a third discharge process for discharging the compressed gas from the inspection chamber $w_3$ and the reference chamber m (step S16). FIG. 16 illustrates the open/closed states of the valves during the execution of the third discharge process. In the third discharge process, the reference valve $V_2$, the common inspection valve $V_3$, and the discharge valve $V_e$ that have been in the closed state in the third measurement process are opened. As a result, the compressed gas inside the reference path $P_2$, the common inspection path $P_3$, the branch inspection path $P_{43}$, the reference chamber m, and the inspection chamber $w_3$ is discharged to the outside. Through the above processes, the inspection of the inspection chambers $w_1$ to $w_3$ for pressure leaks is ended.

As described above, since the first, the second, and the third compression processes for compressing the insides of the inspection chambers $w_1$ to $w_3$ to respective desired pressures are sequentially executed, the inside of the inspection chamber $w_2$ can be compressed to a desired pressure regardless of whether there is a pressure leak from the inspection chamber $w_1$, and similarly, the inside of the inspection chamber $w_3$ can be compressed to a desired pressure regardless of whether there is a pressure leak from the inspection chamber $w_2$. Therefore, it is possible to inspect the inspection chambers $w_1$ to $w_3$ for pressure leaks with high accuracy.

In addition, the first pre-compression process for pre-compressing the inspection chamber $w_2$ is executed during the execution of the first inspection process for inspecting the inspection chamber $w_1$. For this reason, the execution period of the second compression process, which is executed after the first pre-compression process, for compressing the inspection chamber $w_2$ in the second inspection process is reduced. Similarly, the second pre-compression process for pre-compressing the inspection chamber $w_3$ is executed during the execution of the second inspection process for inspecting the inspection chamber $w_2$. For this reason, the execution period of the third compression process, which is executed after the second pre-compression process, for compressing the inspection chamber $w_3$ in the third inspection process is reduced. Therefore, a required time period from the start of the inspection of the inspection chamber $w_1$ to the end of the inspection of the inspection chamber $w_3$ is reduced.

In the above-described embodiment, while the first compression process, the first equilibrium process, the first measurement process, and the first discharge process are executed in this order, the first pre-compression process for pre-compressing the inspection chamber $w_2$ is continually executed by opening the pre-compression valve $V_{62}$. In this manner, since the pre-compression period of the inspection chamber $w_2$ can be secured, the above embodiment is appropriate for, for example, a case where it takes time for the pressure inside the inspection chamber $w_2$ to reach the first pre-compression target value because the volume of the inspection chamber $w_2$ is relatively large or because the first pre-compression target value is high.

The period during which the first pre-compression process is executed is not limited to the above. For example, the first pre-compression process may be started by opening the pre-compression valve $V_{62}$ during the execution of the first compression process and stopped by closing the pre-compression valve $V_{62}$ during the execution of the first equilibrium process, the first measurement process, or the first discharge process. The time required for the first compression process depends on the volume of the inspection chamber $w_1$, but it is generally longer than the time required for the first equilibrium process, the first measurement process, or the first discharge process. Therefore, from the viewpoint of securing the time required for the first pre-compression process, the first pre-compression process may be started during the execution of the first compression process.

Alternatively, the first pre-compression process may be started during the execution of the first equilibrium process and stopped during the execution of the first measurement process or the first discharge process. Alternatively, the first pre-compression process may be started during the execution of the first measurement process and stopped during the execution of the first discharge process. Alternatively, the first pre-compression may be started and stopped during the execution of the first compression process, or started and stopped during the execution of the first measurement process. The above alternatives are appropriate for, for example, a case where the pressure inside the inspection chamber $w_2$ reaches the first pre-compression target value in a relatively short time period because the volume of the inspection chamber $w_2$ is small or because the first pre-compression target value is low.

Similarly, in the above-described embodiment, while the second compression process, the second equilibrium process, the second measurement process, and the second discharge process are executed in this order, the second pre-compression process for pre-compressing the inspection chamber $w_3$ is continually executed by opening the pre-compression valve $V_{63}$, but the present disclosure is not limited thereto. For example, the second pre-compression process may be executed during the execution of any one of the second compression process, the second equilibrium process, and the second measurement process and stopped before the start of the third inspection process.

In the first compression process, the pre-compression valve $V_{61}$ may be opened together with the inspection valve $V_{41}$. In this case, in the first compression process, while the compressed gas is supplied to the inspection chamber $w_1$ via the supply path $P_1$, the common inspection path $P_3$, and the branch inspection path $P_{41}$, the compressed gas can also be supplied to the inspection chamber $w_1$ via the common pre-compression path $P_5$, the branch pre-compression path $P_{61}$, and a part of the branch inspection path $P_{41}$. In this case, the pre-compression valve $V_{61}$ is closed in the first equilibrium process and the first measurement process.

Timing of Opening Inspection Valve $V_{42}$ in Second Compression Process

Figure 17A:
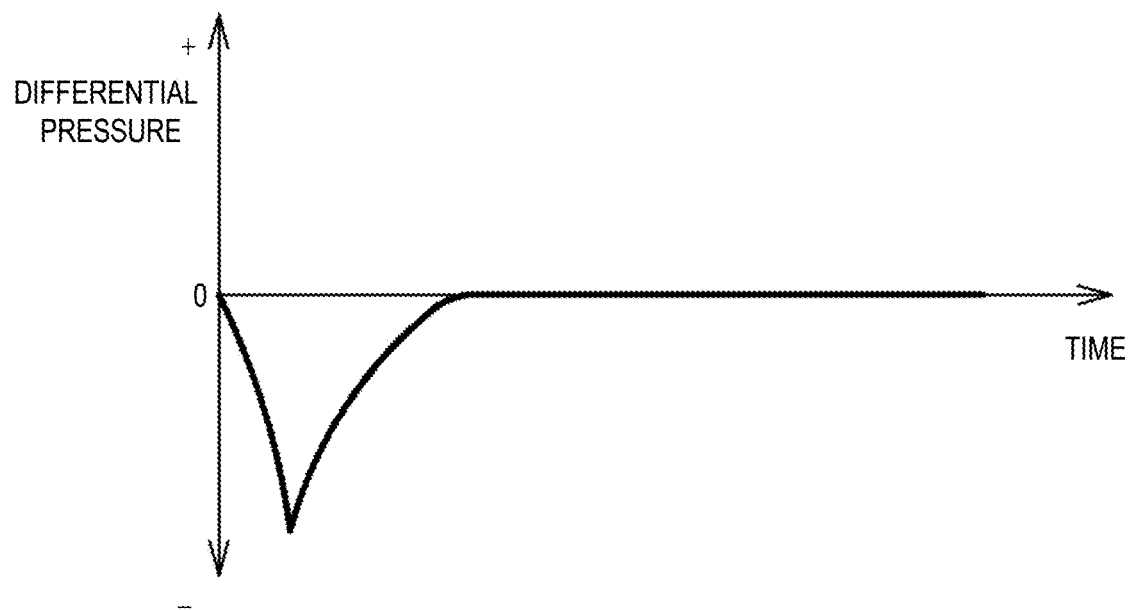
FIG. 17A is a graph illustrating a differential pressure measured by a differential pressure sensor when an inspection valve is opened before a start of compression of the inside of a reference chamber and the inside of a common inspection path in the second compression process.

Next, the timing of opening the inspection valve $V_{42}$ in the second compression process will be described. In the above-described embodiment, as illustrated in FIGS. 6 to 8, after the end of the first pre-compression process for pre-compressing the inspection chamber $w_2$, the inspection valve $V_{42}$ is not opened in the first half of the second compression process and is opened in the second half of the second compression process. Hereinafter, a case where the inspection valve $V_{42}$ is opened after the end of the first pre-compression process and before the start of the compression of the insides of the reference chamber m and the common inspection path $P_3$ in the second compression process will be described. FIG. 17A is a graph illustrating a differential pressure measured by the differential pressure sensor S in the case where the inspection valve $V_{42}$ is opened before the start of the compression of the insides of the reference chamber m and the common inspection path $P_3$ in the second compression process. In FIG. 17A, the vertical axis represents the differential pressure and the horizontal axis represents time. The differential pressure illustrated in FIG. 17A, which is measured by the differential pressure sensor S, is obtained by subtracting a pressure inside the common inspection path $P_3$ from a pressure inside the reference path $P_2$. The pressure inside the common inspection path $P_3$, before the start of the compression of the insides of the reference chamber m and the common inspection path $P_3$ in the second compression process, reaches the atmospheric pressure due to the first discharge process that is executed immediately before the second compression process. In addition, a differential pressure between the inside of the inspection chamber $w_2$, which is maintained at the first pre-compression target value by the pre-compression, and the inside of the common inspection path $P_3$ before the start of the compression is large. In this state, when the inspection valve $V_{42}$ is opened, the pressure inside the common inspection path $P_3$ may suddenly increase such that an impact may be applied to the differential pressure sensor S to influence it.

Figure 17B:
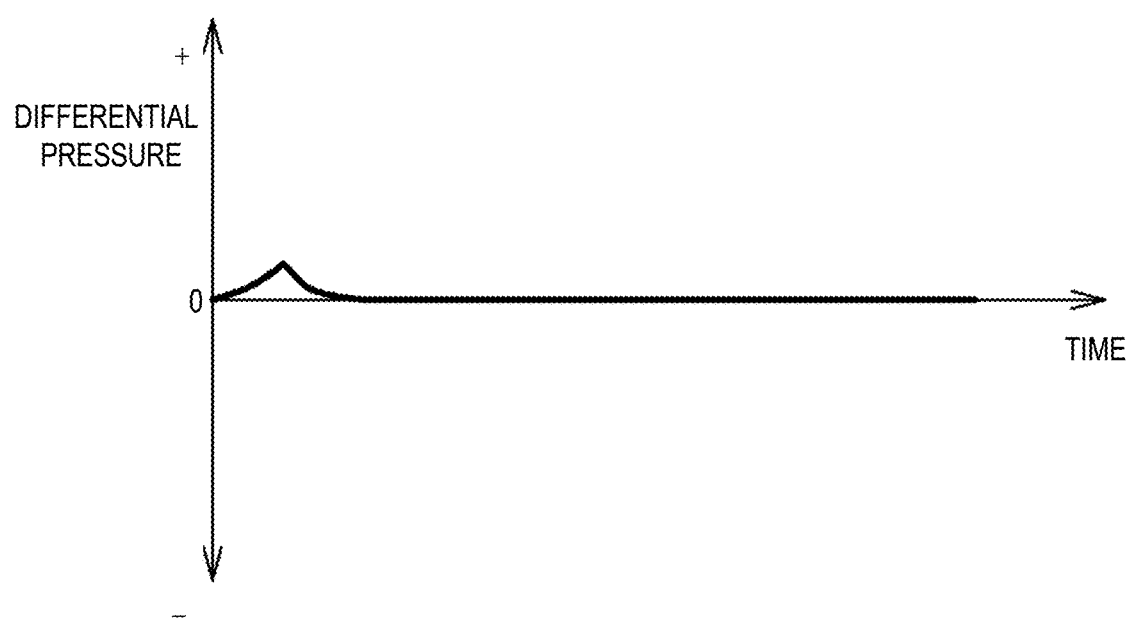
FIG. 17B is a graph illustrating a differential pressure measured by the differential pressure sensor when the inspection valve is opened in the second half of the second compression process.

FIG. 17B is a graph illustrating a differential pressure measured by the differential pressure sensor S in a case where the inspection valve $V_{42}$ is opened in the second half of the second compression process. FIG. 17B corresponds to FIG. 17A. In the present embodiment, by opening the inspection valve $V_{42}$ in the second half of the second compression process after the start of the compression of the inside of the common inspection path $P_3$, the sudden increase in the pressure inside the common inspection path $P_3$ is restricted, such that the impact on the differential pressure sensor S is restricted.

As described above, the inspection valve $V_{42}$ is opened after the discharge valve $V_e$ is closed and the supply valve $V_1$, the reference valve $V_2$, and the common inspection valve $V_3$ are opened. As a result, the impact on the differential pressure sensor S is restricted. For the same reason as above, as illustrated in FIGS. 11 to 13, the inspection valve $V_{43}$ is opened after the end of the second pre-compression process and the start of the compression of the inside of the common inspection path $P_3$ in the third compression process.

However, when the differential pressure between the inside of the common inspection path $P_3$ and the inside of the inspection chamber $w_2$ is equal to or less than a predetermined value, the inspection valve $V_{42}$ may be opened. The differential pressure is equal to or less than the predetermined value when, for example, the pressure inside the common inspection path $P_3$ reaches the second compression target value and the pressure inside the inspection chamber $w_2$ reaches the first pre-compression target value. In other words, the second compression target value and the first pre-compression target value are set in advance such that the differential pressure is equal to or less than a predetermined value. Whether the differential pressure between the inside of the common inspection path $P_3$ and the inside of the inspection chamber $w_2$ is equal to or less than the predetermined value can be determined based on the pressure inside the common inspection path $P_3$ and the first pre-compression target value. The pressure inside the common inspection path $P_3$ may be estimated based on an elapsing time period since the execution of the first compression process, or acquired using the pressure sensor provided on the common inspection path $P_3$ or the reference path $P_2$.

Other Embodiments

Further, the branch pre-compression paths $P_{62}$, $P_{63}$ are connected to the branch inspection paths $P_{42}$, $P_{43}$, respectively. As a result, the branch inspection path $P_{42}$ used in the second inspection process for inspecting the inspection chamber $w_2$ is also used in the first pre-compression process for pre-compressing the inspection chamber $w_2$. Similarly, the branch inspection path $P_{43}$ used in the third inspection process for inspecting the inspection chamber $w_3$ is also used in the second pre-compression process for pre-compressing the inspection chamber $w_3$. As a result, an increase in a material cost of pipes is restricted, and an increase in the size of the device is also restricted.

During the execution of the first inspection process, the first and the second pre-compression processes may be executed at the same time. In this case, both the inspection chambers $w_2$ and $w_3$ can be pre-compressed by opening both the pre-compression valves $V_{62}$ and $V_{63}$.

In the above embodiment, the first and the second discharge processes are executed, but in a predetermined case, they do not necessarily have to be executed. For example, when the first compression target value is less than the second compression target value, the pressures inside the reference path $P_2$ and the common inspection path $P_3$ after the end of the first measurement process are equal to or less than the first compression target value regardless of whether there is a pressure leak from the inspection chamber $w_1$. Therefore, after the end of the first measurement process, the second compression process may be executed by closing the inspection valve $V_{41}$ and opening the supply valve $V_1$, the reference valve $V_2$, and the common inspection valve $V_3$ without executing the first discharge process. Since the first discharge process is not executed, the second inspection process can be executed early. Further, when there is no pressure leak from the inspection chamber $w_1$, the pressures inside both the reference path $P_2$ and the common inspection path $P_3$ are maintained at approximately the first compression target value at the end point of the first measurement process. Therefore, the pressures inside the reference path $P_2$ and the common inspection path $P_3$ can reach the second compression target value early in the first half of the second compression process, and the second compression process can be ended early. When the second compression target value is less than the third compression target value, the second discharge process to be executed after the end of the second measurement process does not have to be executed, either.

As described above, the first to the third compression target values may be the same as but may be different from each other. For example, the first to the third compression target values may be set to be different from each other in consideration of the sizes of volumes of the inspection chambers $w_1$ to $w_3$, the original environment thereof or purpose of their use, or the like. The same applies to the first and the second pre-compression target values.

In the above embodiment, the inspection is executed in order of the inspection chambers $w_1$ to $w_3$, but the order is not limited thereto and may be executed in order of the inspection chambers $w_3$, $w_2$, $w_1$. For example, the inspection chamber $w_2$ may be pre-compressed during the execution of the inspection process of the inspection chamber $w_3$, and the inspection chamber $w_1$ may be pre-compressed during the execution of the inspection process of the inspection chamber $w_2$. For example, when the insides of the reference chamber m and the inspection chamber $w_2$ are compressed while the inside of the inspection chamber $w_1$ is pre-compressed, the insides of the reference chamber m and the inspection chamber $w_2$ can be compressed by opening the supply valve $V_1$, the reference valve $V_2$, the common inspection valve $V_3$, and the inspection valve $V_{42}$ and closing the inspection valves $V_{41}$, $V_{43}$, and the inside of the inspection chamber $w_1$ can be pre-compressed by opening the pre-compression valve $V_{61}$ and closing the pre-compression valves $V_{62}$, $V_{63}$. Similarly, the inspection may be executed in order of the inspection chambers $w_2$, $w_1$, $w_3$, or in order of the inspection chambers $w_2$, $w_3$, $w_1$.

In the above embodiment, the common pre-compression path $P_5$ and the branch pre-compression path $P_{62}$ are used when the inspection chamber $w_2$ is pre-compressed, and the common pre-compression path $P_5$ and the branch pre-compression path $P_{63}$ are used when the inspection chamber $w_3$ is pre-compressed. Further, the common pre-compression path $P_5$ and the branch pre-compression path $P_{61}$ are used when the inspection chamber $w_1$ is pre-compressed. In other words, the common pre-compression path $P_5$ is shared when the inspection chambers $w_1$ to $w_3$ are pre-compressed. Therefore, the lengths of the entire pipes can be reduced and an increase in a manufacturing cost can be restricted, as compared with a case where the pipes used when pre-compressing the inspection chambers $w_1$ to $w_3$ are individually provided. Further, the electro-pneumatic regulator $R_5$ is provided on the common pre-compression path $P_5$ that is shared as above. Therefore, the increase in the manufacturing cost is restricted, as compared with a case where such an electro-pneumatic regulator is provided on each of the branch pre-compression paths $P_{61}$ to $P_{63}$.

In the above embodiment, the single control device 100 controls the electro-pneumatic regulator $R_1$, the supply valve $V_1$, and the like, but a plurality of control devices may control them. For example, a first control device may control the electro-pneumatic regulator $R_1$, the supply valve $V_1$, the reference valve $V_2$, and the common inspection valve $V_3$ and acquire a measured value of the differential pressure sensor S, and a second control device capable of communicating with the first control device may control the electro-pneumatic regulator $R_5$, the inspection valves $V_{41}$, $V_{42}$, $V_{43}$, and the pre-compression valves $V_{61}$, $V_{62}$, $V_{63}$.

In the above embodiment, three inspection chambers $w_1$ to $w_3$ are formed in the work W, but a work in which two inspection chambers are formed may also be a target to be inspected. In this case, for example, the branch inspection path $P_{43}$, the inspection valve $V_{43}$, the branch pre-compression path $P_{63}$, and the pre-compression valve $V_{63}$ do not have to be provided. Further, four or more inspection chambers may also be formed in a work. For example, when a work in which four inspection chambers are formed is inspected, the above-described leak inspection device 1 is further provided with a set of the branch inspection path, the inspection valve, the branch pre-compression path, and the pre-compression valve.

In the above embodiment, the inspection chambers $w_1$ to $w_3$ are formed in the single work W, but the present disclosure is not limited thereto and the inspection chambers may also be formed in a plurality of works. In this case, the works may be the same as or different from each other.

In the above embodiment, the single supply source A is used for executing the above-described compression processes and pre-compression processes. Therefore, an increase in a manufacturing cost of the leak inspection device 1 is restricted, as compared with a case where a supply source for the compression processes and a supply source for the pre-compression processes are separately provided. However, the present disclosure is not limited thereto and, for example, the supply source A may be used for the compression processes, and another supply source different from the supply source A may be used for the pre-compression processes. In this case, the common pre-compression path $P_5$ is connected to a supply source different from the supply source A, not to the supply path $P_1$.

First Modified Example

Figure 18:
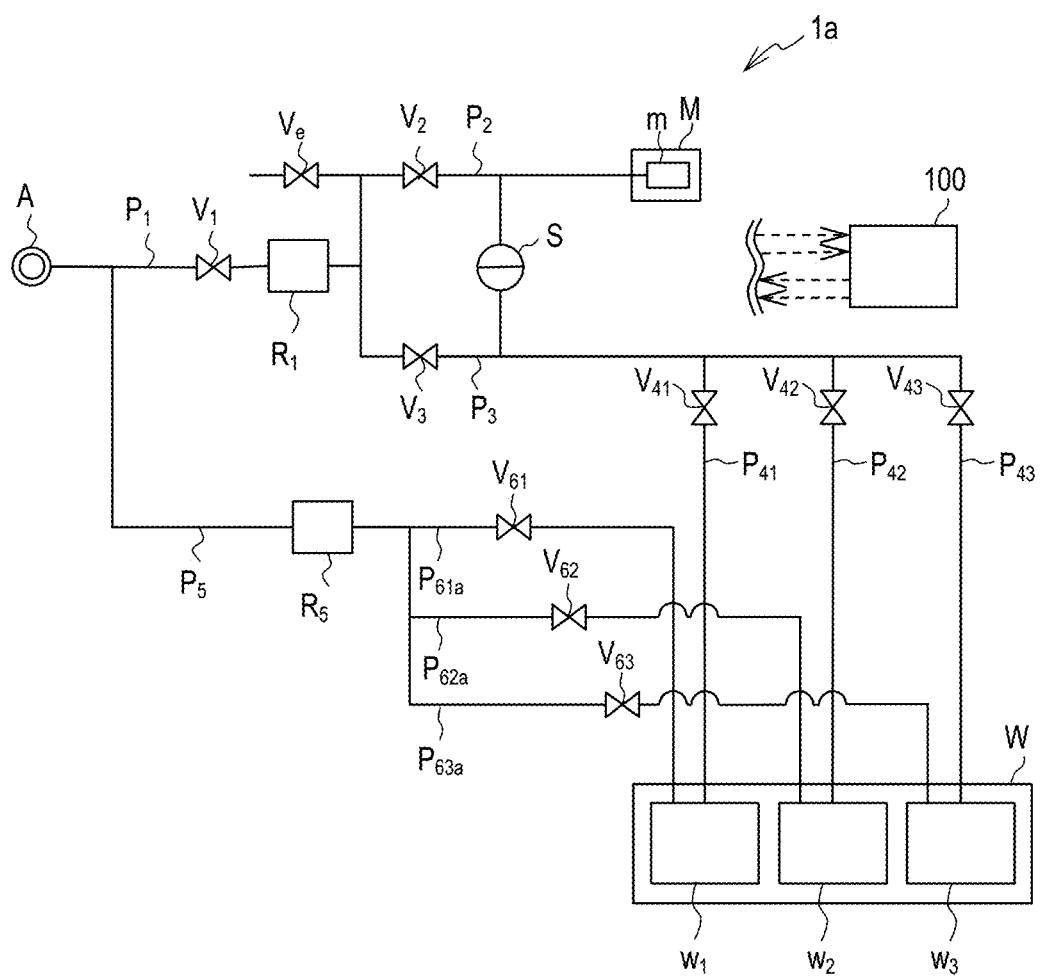
FIG. 18 is a schematic configuration diagram of a leak inspection device of a first modified example.

FIG. 18 is a schematic configuration diagram of a leak inspection device 1a according to a first modified example. In the leak inspection device 1a, branch pre-compression paths $P_{61a}$ to $P_{63a}$ are not connected to the branch inspection paths $P_{41}$ to $P_{43}$, respectively, but directly connected to the inspection chambers $w_1$ to $w_3$, respectively. For example, when it is more costly to process the existing branch inspection paths $P_{41}$ to $P_{43}$ to connect pipes to them, respectively, or when it is difficult to connect the pipes to the branch inspection paths $P_{41}$ to $P_{43}$, respectively, due to the situation around the device, it is more appropriate to connect the pipes directly to the inspection chambers $w_1$ to $w_3$ than to connect the pipes to the branch inspection paths $P_{41}$ to $P_{43}$ for, for example, reducing the lengths of the total pipes. In the first modified example, the branch pre-compression but the present disclosure is not limited thereto and at least one pipe may be connected to one of the inspection chambers $w_1$ to $w_3$.

Second Modified Example

Figure 19:
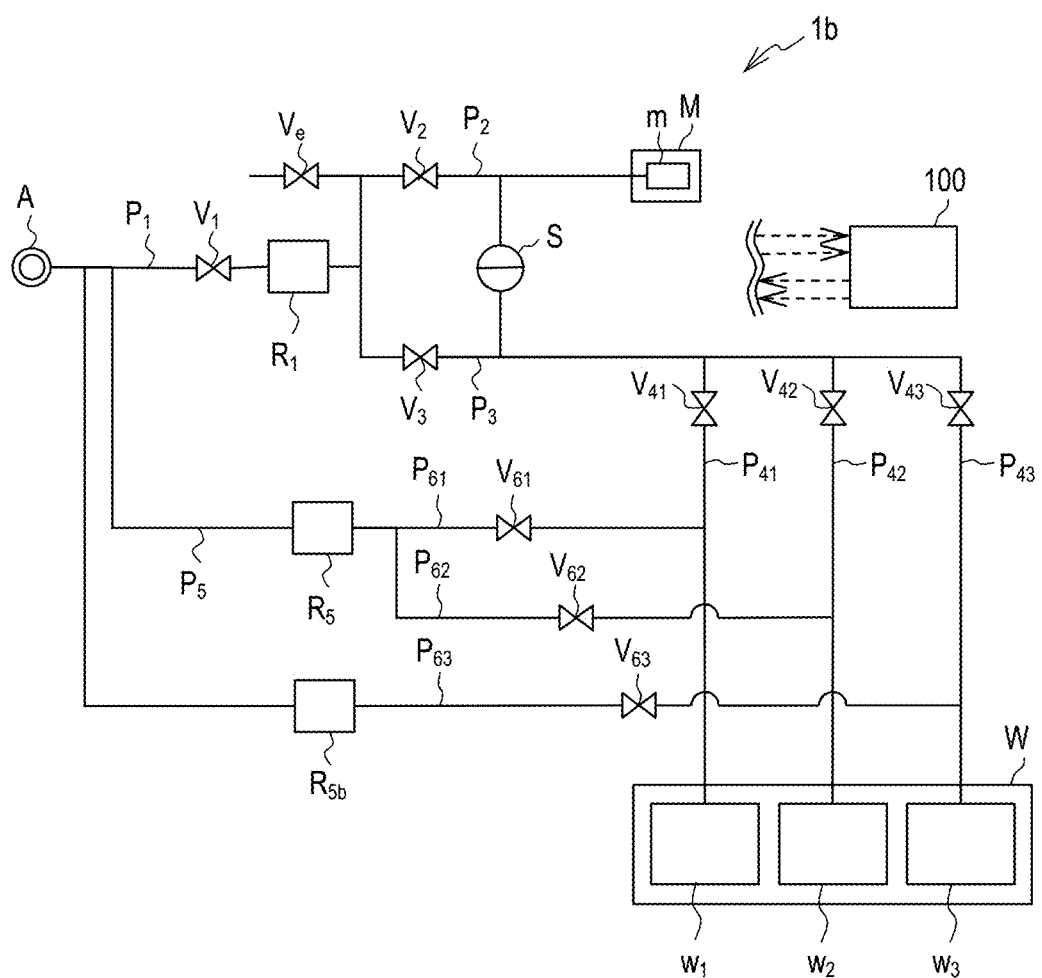
FIG. 19 is a schematic configuration diagram of a leak inspection device of a second modified example.

FIG. 19 is a schematic configuration diagram of a leak inspection device 1b according to a second modified example. In the leak inspection device 1b, a branch pre-compression path $P_{63b}$ is connected to the supply path $P_1$, not to the common pre-compression path $P_5$. Further, the branch pre-compression path $P_{63b}$ is provided with a fixed regulator $R_{5b}$ different from the electro-pneumatic regulator $R_5$. Unlike the electro-pneumatic regulators $R_1$, $R_5$, the fixed regulator $R_{5b}$ can adjust a pressure on the downstream side of the fixed regulator $R_{5b}$ to a fixed value set in advance. For example, when the third pre-compression target value of the inspection chamber $w_3$ is greater than the first and the second pre-compression target values of the inspection chambers $w_1$ and $w_2$, respectively, and the pressure inside the inspection chamber $w_3$ cannot be maintained at the third pre-compression target value by the electro-pneumatic regulator $R_5$, the pressure inside the inspection chamber $w_3$ can be maintained at the third pre-compression target value by the fixed regulator $R_{5b}$. The fixed regulator $R_{5b}$ is an example of the pre-compression adjustment unit. The branch pre-compression path $P_{63b}$ is connected to the supply path $P_1$, but it may be connected to the common pre-compression path $P_5$. An electro-pneumatic regulator may be used instead of the fixed regulator $R_{5b}$, but by using the fixed regulator $R_{5b}$, an increase in the manufacturing cost can be restricted.

The embodiments of the present disclosure have been described above in detail, but the present disclosure is not limited to such specific embodiments, and various modifications and changes can be made within the scope of the present disclosure described in the claims.

What is claimed is:

1. A leak inspection device comprising:
   an inspection mechanism configured to execute
      a first inspection process for compressing an inside of a first inspection chamber and an inside of a reference chamber using a compressed gas, and for inspecting the first inspection chamber for a pressure leak based on a differential pressure between the inside of the first inspection chamber and the inside of the reference chamber, and
      a second inspection process for compressing, after an end of the first inspection process, an inside of a second inspection chamber and the inside of the reference chamber using the compressed gas, and for inspecting the second inspection chamber for a pressure leak based on a differential pressure between the inside of the second inspection chamber and the inside of the reference chamber;
   a first pre-compression path configured to pre-compress the inside of the second inspection chamber using the compressed gas;
   a first pre-compression valve configured to open and close the first pre-compression path; and
   a control device configured to control the inspection mechanism and the first pre-compression valve,
   wherein the control device is configured to:
      during an execution of the first inspection process, open the first pre-compression valve to pre-compress the second inspection chamber; and
      in a state where the inside of the second inspection chamber is pre-compressed, cause the inspection mechanism to execute the second inspection process.

2. The leak inspection device according to claim 1, wherein:
   the first inspection process includes:
      a first compression process for compressing the inside of the first inspection chamber and the inside of the reference chamber;
      a first equilibrium process for equilibrating, after an end of the first compression process, a pressure inside the first inspection chamber and a pressure inside the reference chamber; and
      a first measurement process for measuring, after an end of the first equilibrium process, the differential pressure between the inside of the first inspection chamber and the inside of the reference chamber; and
   the control device is configured to, during an execution of at least one of the first compression process and the first measurement process, open the first pre-compression valve to pre-compress the inside of the second inspection chamber.

3. The leak inspection device according to claim 2, wherein the control device is configured to, during the execution of the first compression process, open the first pre-compression valve to pre-compress the inside of the second inspection chamber.

4. The leak inspection device according to claim 1, further comprising:
   a second pre-compression path configured to pre-compress an inside of a third inspection chamber; and
   a second pre-compression valve configured to open and close the second pre-compression path, wherein:
   the inspection mechanism is configured to, after an end of the second inspection process, execute a third inspection process for compressing the inside of the third inspection chamber and the inside of the reference chamber using the compressed gas, and for inspecting the third inspection chamber for a pressure leak based on a differential pressure between the inside of the third inspection chamber and the inside of the reference chamber; and
   the control device is configured to, during an execution of the second inspection process, open the second pre-compression valve to pre-compress the inside of the third inspection chamber, and, in a state where the inside of the third inspection chamber is pre-compressed, cause the inspection mechanism to execute the third inspection process.

5. The leak inspection device according to claim 4, wherein:
   the first pre-compression path and the second pre-compression path share a common pre-compression path;
   the first pre-compression path includes a first branch pre-compression path branched from the common pre-compression path;
   the second pre-compression path includes a second branch pre-compression path branched from the common pre-compression path; and
   the first pre-compression valve and the second pre-compression valve are configured to respectively open and close the first branch pre-compression path and the second branch pre-compression path.

6. The leak inspection device according to claim 5, further comprising:
   a pre-compression adjustment unit which is provided on the common pre-compression path and configured to adjust an output pressure of a supplied compressed gas, wherein the control device is configured to set, in the pre-compression adjustment unit, a first pre-compression target value, which is a target value of a pressure inside the second inspection chamber due to the pre-compression, and set, in the pre-compression adjustment unit, a second pre-compression target value, which is a target value of a pressure inside the third inspection chamber due to the pre-compression, the first and the second pre-compression target values being different from each other.

7. The leak inspection device according to claim 1, wherein:
   the inspection mechanism includes:
      a supply path connected to a supply source of the compressed gas;

a reference path connected to the supply path and the reference chamber;

a common inspection path connected to the supply path;

a first inspection path connected to the common inspection path and the first inspection chamber;

a second inspection path connected to the common inspection path and the second inspection chamber;

a supply valve, a reference valve, a common inspection valve, a first inspection valve, and a second inspection valve that open and close the supply path, the reference path, the common inspection path, the first inspection path, and the second inspection path, respectively; and a measurement unit configured to measure a differential pressure between an inside of the reference path and an inside of the common inspection path which is on a downstream side of the common inspection valve; and the control device is configured to control the supply valve, the reference valve, the common inspection valve, the first inspection valve, and the second inspection valve such that the first and the second inspection processes are executed.

8. The leak inspection device according to claim 7, wherein the first pre-compression path is connected to the supply path such that the compressed gas is supplied from the supply source.

9. The leak inspection device according to claim 7, wherein the first pre-compression path is connected to the second inspection path on a downstream side of the second inspection valve.

10. The leak inspection device according to claim 7, wherein the first pre-compression path is connected to the second inspection chamber, not to the second inspection path.

11. The leak inspection device according to claim 7, wherein:

the second inspection process includes a second compression process for compressing the inside of the second inspection chamber and the inside of the reference chamber; and the control device is configured to, in the second compression process, open the supply valve, the reference valve, and the common inspection valve and close the first inspection valve and the second inspection valve to start the compression of the inside of the reference chamber, and then open the second inspection valve to compress the inside of the second inspection chamber.

12. The leak inspection device according to claim 7, wherein:

the inspection mechanism includes a compression adjustment unit which is provided on the supply path on a downstream side of the supply valve and configured to adjust an output pressure of a supplied compressed gas; and the control device is configured to set, in the compression adjustment unit, a first compression target value, which is a target value of a pressure inside the first inspection chamber and a pressure inside the reference chamber due to the compression in the first inspection process, and set, in the compression adjustment unit, a second compression target value, which is a target value of a pressure inside the second inspection chamber and the pressure inside the reference chamber due to the compression in the second inspection process, the first and the second compression target values being different from each other.

13. A leak inspection method, comprising:

a first inspection process including compressing an inside of a first inspection chamber and an inside of a reference chamber using a compressed gas, pre-compressing a second inspection chamber using the compressed gas, and while the second inspection chamber is being pre-compressed, inspecting the first inspection chamber for a pressure leak based on a differential pressure between the inside of the first inspection chamber and the inside of the reference chamber; and after an end of the first inspection process, a second inspection process including compressing an inside of the pre-compressed second inspection chamber and the inside of the reference chamber using the compressed gas, and inspecting the compressed second inspection chamber for a pressure leak based on a differential pressure between the inside of the second inspection chamber and the inside of the reference chamber.

14. The leak inspection method according to claim 13, wherein a first compression target value, which is a target value of a pressure inside the first inspection chamber and the pressure inside the reference chamber due to the compression in the first inspection process, and a second compression target value, which is a target value of a pressure inside the second inspection chamber and the pressure inside the reference chamber due to the compression in the second inspection process, are different from each other.

15. The leak inspection method according to claim 13, wherein volumes of the first inspection chamber and the second inspection chamber are different from each other.

* * * * *